US012662141B2

(12) United States Patent
Aragon et al.

(10) Patent No.: US 12,662,141 B2
(45) Date of Patent: Jun. 23, 2026

(54) PROCESSING SYSTEM FOR EVALUATING AUTONOMOUS VEHICLE CONTROL SYSTEMS THROUGH CONTINUOUS LEARNING

(71) Applicant: Allstate Insurance Company, Northbrook, IL (US)

(72) Inventors: Juan Carlos Aragon, Redwood City, CA (US); Regina Madigan, Mountain View, CA (US)

( * ) Notice: Subject to any disclaimer, the term of this patent is extended or adjusted under 35 U.S.C. 154(b) by 0 days.

(21) Appl. No.: 18/674,216

(22) Filed: May 24, 2024

(65) Prior Publication Data

US 2024/0310833 A1 Sep. 19, 2024

Related U.S. Application Data

(63) Continuation of application No. 16/232,210, filed on Dec. 26, 2018, now Pat. No. 11,994,860.

(Continued)

(51) Int. Cl.
*G05D 1/00* (2024.01)
*G05D 1/227* (2024.01)
(Continued)

(52) U.S. Cl.
CPC ......... *G05D 1/0088* (2013.01); *G05D 1/0055* (2013.01); *G05D 1/227* (2024.01);
(Continued)

(58) Field of Classification Search
CPC ......... G06N 5/00; G06N 20/00; B60W 60/00; B60W 60/0059; G05D 1/0055;
(Continued)

(56) References Cited

U.S. PATENT DOCUMENTS 8,618,922 B2 12/2013 Debouk et al.
8,660,734 B2 * 2/2014 Zhu ........................ G06Q 30/02
701/23

(Continued)

FOREIGN PATENT DOCUMENTS

AU 2017100444 A4 5/2017

OTHER PUBLICATIONS

Hecker S., et al., "Failure Prediction for Autonomous Driving," Retrieved from the Internet URL: https://arxiv.org/pdf/1805.01811. pdf on May 4, 2018, 8 pages.

(Continued)

*Primary Examiner* — Ig T An

(57) ABSTRACT

Aspects of the disclosure relate to an autonomous vehicle evaluation system that performs continuous evaluation of the actions, strategies, preferences, margins, and responses of an autonomous driving control system. A computing platform may receive sensor data from one or more autonomous vehicle sensors, manufacturer computing platform, or V2X computing platform. Based on this sensor data, the computing platform may determine one or more driving patterns. Based on a primary context corresponding to the one or more driving patterns, the computing platform may group the one or more driving patterns. The computing platform may determine a driving pattern degradation output indicating degradation corresponding to the one or more grouped driving patterns, and the computing platform may send the driving pattern degradation output to an autonomous driving system, which may cause the autonomous driving system to take corrective action accordingly.

20 Claims, 11 Drawing Sheets

Related U.S. Application Data

(60) Provisional application No. 62/685,625, filed on Jun. 15, 2018.

(51) Int. Cl.

| | |
|---|---|
| *G05D 1/617* | (2024.01) |
| *G06N 20/00* | (2019.01) |
| *G07C 5/02* | (2006.01) |

(52) U.S. Cl.
CPC ............. *G05D 1/617* (2024.01); *G06N 20/00* (2019.01); *G07C 5/02* (2013.01)

(58) Field of Classification Search
CPC ...... G05D 2201/0213; B60K 2370/175; B60K 28/00; B64G 2001/247; B64C 2201/141
See application file for complete search history.

(56) References Cited

U.S. PATENT DOCUMENTS

| | | | |
|---|---|---|---|
| 8,781,669 | B1 | 7/2014 | Teller et al. |
| 9,346,400 | B2 | 5/2016 | Attard et al. |
| 9,483,059 | B2 | 11/2016 | Caveney |
| 9,576,083 | B2 | 2/2017 | Kozloski et al. |
| 9,645,577 | B1 | 5/2017 | Frazzoli et al. |
| 9,720,418 | B2 | 8/2017 | Stenneth |
| 9,731,713 | B2 | 8/2017 | Horii |
| 9,754,325 | B1 * | 9/2017 | Konrardy .............. G06Q 40/08 |
| 9,940,676 | B1 | 4/2018 | Biemer |
| 2007/0027726 | A1 | 2/2007 | Warren et al. |
| 2008/0009965 | A1 | 1/2008 | Bruemmer et al. |
| 2015/0187019 | A1 | 7/2015 | Fernandes et al. |
| 2015/0239500 | A1 | 8/2015 | Green et al. |
| 2015/0360697 | A1 | 12/2015 | Baek et al. |
| 2016/0132705 | A1 | 5/2016 | Kovarik et al. |
| 2017/0123434 | A1 | 5/2017 | Urano et al. |
| 2017/0255966 | A1 | 9/2017 | Khoury |
| 2018/0061253 | A1 | 3/2018 | Hyun |
| 2018/0268695 | A1 * | 9/2018 | Agnew ................. B60W 50/14 |
| 2018/0284767 | A1 * | 10/2018 | Minegishi ........... B60W 30/182 |

OTHER PUBLICATIONS

International Preliminary Report on Patentability for International Application No. PCT/US2019/037198, mailed Dec. 24, 2020, 09 pages.

International Search Report and Written Opinion for International Application No. PCT/US2019/037198, mailed Sep. 18, 2019, 10 pages.

Katrakazas C., et al., "Real-Time Motion Planning Methods for Autonomous on-road Driving: State-of-the-art and Uture Research Directions," Retrieved from the Internet URL: https://www.sciencedirect.com/science/article/pii/S0968090X15003447, vol. 60, Sep. 24, 2015, pp. 416-442.

Schlenoff C., et al., "Performance Evaluation of Autonomous Vehicle Navigation in Dynamic, on-road Environments," Retrieved from the Internet URL: https://www.researchgate.net/publication/234810336_Performance_evaluation_of_autonomous_vehicle_navigation_in_dynamic_on-road_environments on Oct. 23, 2018, pp. 1-38.

The extended European Search Report for Application No. 19818703.1 dated Mar. 28, 2022 (9 pages).

* cited by examiner

100

PROCESSING SYSTEM FOR EVALUATING AUTONOMOUS VEHICLE CONTROL SYSTEMS THROUGH CONTINUOUS LEARNING

CROSS-REFERENCE TO RELATED CASES

This application claims priority to U.S. patent application Ser. No. 16/232,210 titled PROCESSING SYSTEM FOR EVALUATING AUTONOMOUS VEHICLE CONTROL SYSTEMS THROUGH CONTINUOUS LEARNING" and filed on Dec. 26, 2018, which claims priority to U.S. Provisional Patent Application Ser. No. 62/685,625 titled PROCESSING SYSTEM FOR EVALUATING AUTONO-MOUS VEHICLE CONTROL SYSTEMS USING MACHINE LEARNING and filed on Jun. 15, 2018. The entireties of which are incorporated herein by reference.

BACKGROUND

Autonomous driving technology is based on artificial intelligence and it will continue to develop around artificial intelligence (AI) in the future. Recent accidents involving autonomous driving technologies being developed by industry leaders demonstrate that a paramount concern that needs to be addressed is the need for the technology to be continuously evaluated. In this sense, through continuous evaluation the potential for accidents due to the autonomous driving system's flaws, inefficiencies, and poor performance is minimized, and especially these accidents that involve the loss of life. This need for evaluation is more compelling every day as the autonomous driving technology scales and more autonomous vehicles are deployed over the roads every year.

SUMMARY

Aspects of the disclosure relate to an autonomous vehicle evaluation system that performs continuous evaluation of the actions, strategies, preferences, margins, and responses of an autonomous driving control system.

In the present disclosure, a driving pattern may be defined by the context associated to a given driving scenario and by the actions/responses of the autonomous driving system to such context. It may be expected that a given context will be presented to the autonomous vehicle repeated times and accordingly the autonomous system may respond/react to such context similarly at each presentation. In this case, we have a driving pattern. A driving pattern may be composed of two groups of attributes-primary factors and secondary factors (for each group there may be attributes for context and for actions).

In some embodiments, primary contextual factors may define the general scene and this group may include attributes such as: the environmental scene, the weather, road configuration (e.g., number of lanes), the distribution of neighbor vehicles around the ego-vehicle (e.g., a vehicle corresponding to the autonomous vehicle system), the acceleration/breaking/speed patterns of the neighbor vehicles, the lane changing patterns of neighbor vehicles, the general driving behavior of neighbor vehicles (e.g., aggressiveness, attentiveness, or the like), the speed of the ego-vehicle, the road frustration index associated with the neighbor vehicles, the identification of the neighbor vehicle as human or as another autonomous driving system, aggregated traffic density on the road, incidents (e.g., accidents, malfunctioning vehicles, traffic jams, neighbor vehicle cutting-in, vehicle in front performing hard breaking, or the like), the presence of pedestrians and bicycles, or the like.

In example embodiments, primary driving action factors may be defined by the vehicle and this group may include attributes such as: level of absolute speed, the level of acceleration/de-acceleration, the distance to the leader vehicle, the distance to the vehicle following from behind, lane change, turning, stopping, or the like.

Secondary factors may be more granular factors/aspects of the driving pattern in terms of the context as well as the driving actions. In other embodiments, secondary factors may be more specific elements that provide insights into the perceptual considerations and the different responses that the autonomous system has and develops over time.

Secondary contextual factors may include attributes such as, the actual distribution of neighbor vehicle locations around the ego-vehicle, the actual distribution of speeds and accelerations around the ego-vehicle as well as patterns for speed and acceleration from individual vehicles and from the fleet of vehicles, the distribution of pedestrian locations around, the distribution of obstacles (e.g., construction zones cones, or the like), the distribution of road conflict index around the ego-vehicle, and the distribution of aggressiveness and attentiveness around, the gap that exists on adjacent lanes before performing a lane change, the distribution of vehicles on the intersection (e.g., when driving on urban/suburban/rural roads), the heading of the vehicles, road conditions, weather, advanced driver assistance system (ADAS) information, deceleration, pulling off the road, or the like.

Secondary driving action factors may include attributes such as, the turn rate for lane change applied by the autonomous vehicle, the acceleration curve applied when performing a lane change, the speed pattern applied under the given context category, the breaking pattern applied, the lane change pattern, or the like.

In accordance with one or more arrangements discussed herein, a computing platform having at least one processor, a communication interface, and memory may receive sensor data from one or more autonomous vehicle sensors. Based on the sensor data, the computing platform may determine one or more driving patterns. Based on a set of primary contextual factors and primary driving action factors corresponding to the one or more driving patterns, the computing platform may cluster/group the one or more driving patterns. The computing platform may determine a driving pattern degradation output indicating an adverse outcome as a result of the driving actions corresponding to the one or more clustered/grouped driving patterns, and the computing platform may send the driving pattern degradation output to an autonomous driving system. This may, in turn, modify the autonomous driving control system by updating actions and maneuvers of an autonomous vehicle.

In some embodiments, the computing platform may determine, based on a state of a vehicle following execution of the one or more driving patterns, outcome information for the one or more driving patterns. Based on the outcome information, the computing platform may evaluate the one or more clustered/grouped driving patterns. The evaluation may indicate that a driving pattern presents degradation if it is assessed that the outcome of the driving actions corresponding to such pattern generates high risk and/or reduced efficiency/performance. The computing platform may also evaluate and track the modifications to the driving pattern and assess the level of risk and efficiency/performance of the evolved/modified driving pattern by assessing the outcomes of the driving actions corresponding to such pattern, and may compare to this level of risk of the modified driving pattern to the levels of risk and efficiency/performance for the pattern before the modifications. Additionally, the computing platform may evaluate the ability of the autonomous driving system to adapt and self-modify based on the assessment of the modifications and evolutions of the driving patterns over time.

In some embodiments, the computing platform may determine, by performing unsupervised machine learning the allocation of driving patterns to one or more clusters or groups. The separation between driving patterns belonging to different clusters may be based on criteria that is initially fixed and may be based on fixed weights assigned to the primary factors. The weights may be used to establish a distance metric based on a weighted sum of absolute differences between factors. The distance metric may be used to determine, through unsupervised learning, the composition of the clusters. The weights may change depending on the observation of the driving actions over time and how the autonomous system reacts to the primary factors. In some cases, based on the similarity of the reactions, two different clusters may be combined/fused into a single one.

In some embodiments, the computing platform may determine secondary factors corresponding to the one or more driving patterns. Based at least in part on the secondary factors, the computing platform may determine that the driving pattern has evolved.

In some embodiments, the computing platform may determine that the autonomous driving system has caused evolution of the one or more clustered/grouped driving patterns. The evolution may be implemented by a self-improvement module in the autonomous driving system that performs one or more of: modification of the secondary factors, generating sub-patterns within the one or more clustered/grouped driving patterns, and substituting one or more new secondary factors for one or more of the secondary factors. Based on the evolution caused by the autonomous driving system, the computing platform may evaluate an ability of the autonomous driving system to adapt.

In some embodiments, the computing platform may generate, based on the evolution implemented by the autonomous driving system, one or more learning curves for the autonomous driving system. Using the one or more learning curves, the computing platform may determine that the evolution caused the autonomous driving system to fall below a predetermined safety and performance threshold because the autonomous system is not flexible enough. Particularly not having the ability to cope with unseen situations may be detrimental to safety.

In some embodiments, the computing platform may determine the driving pattern degradation output in response to determining that the evolution caused the autonomous driving system to fall below the predetermined safety and performance threshold. In some embodiments, the computing platform may establish a wireless data connection with a manufacturer computing platform. The computing platform may send, to the manufacturer computing platform and using the wireless data connection, the driving pattern degradation output.

In some embodiments, by sending the driving pattern degradation output to the autonomous driving system, the computing platform may cause the autonomous driving system to update one or more stored driving patterns. This update may be performed by rolling-back such driving pattern to a previous state (which has the previous driving actions) before the evolution of such driving pattern happened and thus before the degraded performance/safety occurred.

BRIEF DESCRIPTION OF DRAWINGS

The present disclosure is illustrated by way of example and not limited in the accompanying figures in which like reference numerals indicate similar elements and in which.

DETAILED DESCRIPTION

Figure 1A:
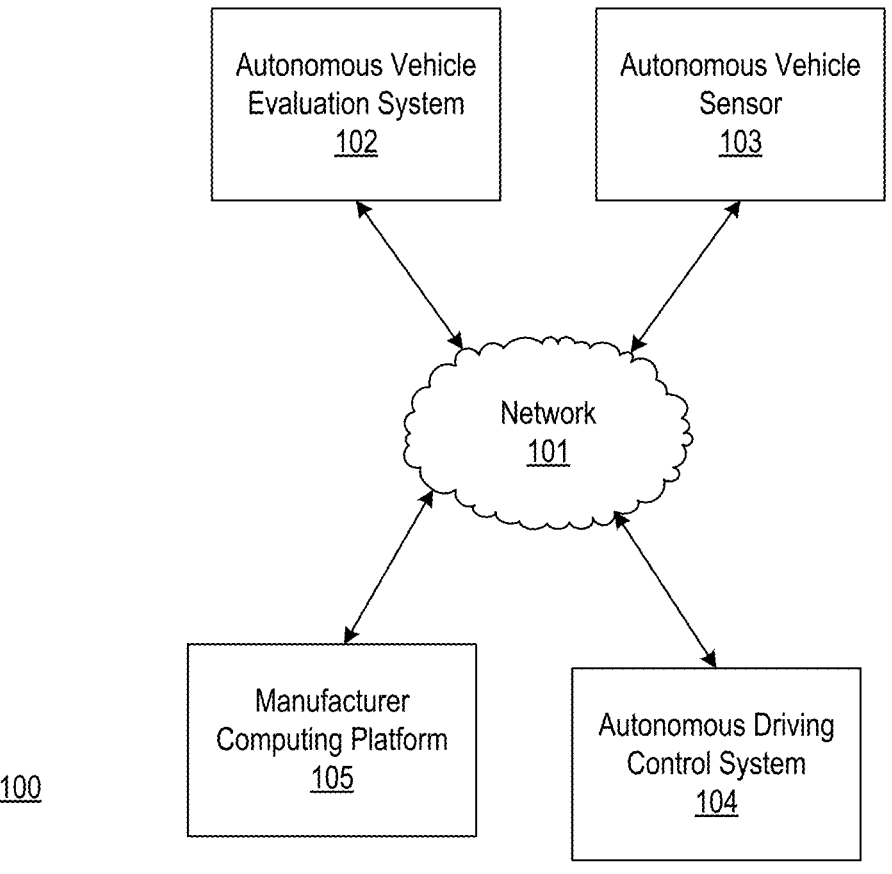
FIGS. 1A-1B depict an illustrative computing environment for deploying an autonomous vehicle evaluation system that performs evaluation of the actions, strategies, preferences, and/or responses of an autonomous driving control system in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Briefly, the following description describes autonomous systems that perform learning and self-modification to improve performance and safety. This may allow systems to learn from its errors. This description addresses continuous evaluation of the updates made to an autonomous vehicle control system through machine learning to ensure theses updates are accurate and safe. Learnings may also be distributed without the autonomous ecosystem so what one vehicle learns through exploration or error identification, all vehicles may learn through the autonomous driving control platform or ecosystem.

The fact that artificial intelligence is at the core of autonomous driving introduces a new paradigm for the auto industry since the autonomous system's software might not be static and deterministic, and may be unable to adapt to new situations and unable to change. It may be expected that the autonomous system will be able to learn over time. Therefore, since the software may continuously change, it is imperative that the autonomous system is also continuously evaluated. The learning on an autonomous system may occur as a result of experiencing close calls, errors recognized by the system and continuous improvement modules embedded in the code of the autonomous driving system. In this sense, it may be advantageous for an automated evaluation system to have the capability to learn the actual self-modifications that the autonomous driving system performs. This disclosure introduces a novel paradigm in the area of automated evaluation and the paradigm involves the use of artificial intelligence to evaluate an artificial intelligence based system.

In summary, the evaluation system may learn the autonomous system's learning through artificial intelligence. Whether the evaluation is performed by an outside entity/organization or by the autonomous driving manufacturer itself, the autonomous system may be monitored/evaluated by a software framework that is independent of the software modules involved on the autonomous vehicle control. Several of the internal artificial intelligence modules inside the autonomous driving system may be complex and may develop complex internal relationships that might not readily be available for individual evaluation or scrutiny (e.g., with deep neural networks and convolutional neural networks). Thus, it may be important for an evaluation framework to be independent of these artificial intelligence modules inside the autonomous vehicle control. Similarly, it may be expected that several other internal mechanisms (e.g., other than neural networks) involved on autonomous control may develop very complex relationships among them, which again may prove un-tractable to attempt to evaluate individually, and may provide incomplete information (e.g., because these relationships may only represent a part of the whole information processing). Therefore, it may be important for an evaluation system to be independent of the autonomous driving system and to evaluate the autonomous system as a whole in order to capture the resulting effect of all the processing that occurs inside the autonomous control (e.g., to evaluate holistically). This may be even more compelling if the evaluation is performed by an organization outside of the autonomous driver manufacturer because in this case such organization might not even have any visibility to the autonomous vehicle manufacturer's code. These and other features are described further herein.

Figure 1B:
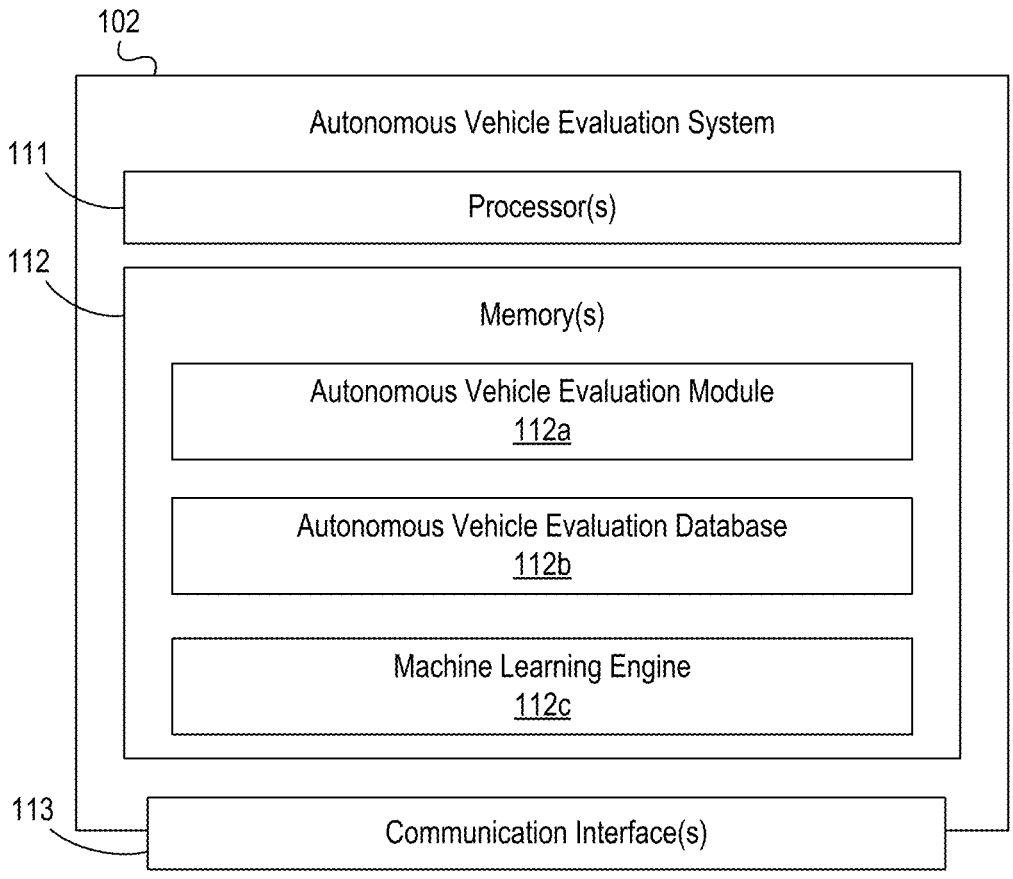

FIGS. 1A-1B depict an illustrative computing environment for deploying an autonomous vehicle evaluation system for performing evaluation of the actions, strategies, preferences, margins, and/or responses of an autonomous driving control system in accordance with one or more example embodiments. Referring to FIG. 1A, computing environment 100 may include one or more computer systems. For example, computing environment 100 may include an autonomous vehicle evaluation system 102, one or more autonomous vehicle sensors 103, an autonomous driving control system 104, and a manufacturer computing platform 105.

Autonomous vehicle evaluation system 102 may be a computer system that includes one or more computing devices and/or other computer components (e.g., processors, memories, communication interfaces, laptop computers, desktop computers, servers, server blades, or the like) configured to perform particular functions. Autonomous vehicle evaluation system 102 is described in greater detail below with regard to FIG. 1B.

Autonomous vehicle sensor 103 may be a sensor device or sensor array to which the autonomous driving control system 104 connects. In some examples, the autonomous vehicle sensor 103 may be located in an autonomous vehicle controlled by the autonomous driving control system 104. For example, the autonomous vehicle sensor 103 may be one or more of: thermometers, accelerometers, Lidar, Radar, gyroscopes, speedometers, cameras, or the like.

Autonomous driving control system 104 may be a computer system that includes one or more computing devices and/or other computer components (e.g., processors, memories, communication interfaces, and the like) configured to perform particular functions. In some examples, the autonomous driving control system 104 may be capable of communicating with the autonomous vehicle evaluation system 102 and may be capable of controlling actions and maneuvers of an autonomous vehicle.

Manufacturer computing platform 105 may include one or more computing devices and/or other computer components (e.g., processors, memories, communication interfaces) configured to perform particular functions. In addition, and as illustrated in greater detail below, manufacturer computing platform 105 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by manufacturer computing platform 105 may be associated with an internal portal provided by an organization, such as database or simulation platform provided by an autonomous vehicle manufacturer. Such a portal may, for instance, provide employees of an autonomous vehicle manufacturer with access to information used to update one or more systems corresponding to an autonomous vehicle and/or may provide employees of the manufacturer with menus, controls, and/or other options to execute various actions. In one or more instances, the methods described herein may apply to the autonomous ecosystem (as opposed to merely a vehicle specific manufacturer). The distributed learning described herein may give all vehicles within the autonomous ecosystem the ability to improve safety, which may allow for safety adaptation for a consortium of autonomous vehicles.

Computing environment 100 also may include one or more networks, which may connect autonomous vehicle evaluation system 102, autonomous vehicle sensor 103, autonomous driving control system 104, and manufacturer computing platform 105. For example, computing environment 100 may include a network 101 (which may interconnect, e.g., autonomous vehicle evaluation system 102, autonomous vehicle sensor 103, autonomous driving control system 104, and manufacturer computing platform 105).

In one or more arrangements, autonomous vehicle evaluation system 102, autonomous vehicle sensor 103, autonomous driving control system 104, manufacturer computing platform 105, and/or the other systems included in computing environment 100 may be any type of computing device capable of sending and receiving sensor data, and generating one or more commands based on the sensor data. For example, autonomous vehicle evaluation system 102, autonomous vehicle sensor 103, autonomous driving control system 104, manufacturer computing platform 105 and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of autonomous vehicle evaluation system 102, autonomous vehicle sensor 103, autonomous driving control system 104, and manufacturer computing platform 105 may, in some instances, be special-purpose computing devices configured to perform specific functions.

Referring to FIG. 1B, autonomous vehicle evaluation system 102 may include one or more processors 111, memory 112, and communication interface 113. A data bus may interconnect processor 111, memory 112, and communication interface 113. Communication interface 113 may be a network interface configured to support communication between autonomous vehicle evaluation system 102 and one or more networks (e.g., network 101, or the like). Memory 112 may include one or more program modules having instructions that when executed by processor 111 cause autonomous vehicle evaluation system 102 to perform one or more functions described herein and/or one or more databases that may store and/or otherwise maintain information which may be used by such program modules and/or processor 111. In some instances, the one or more program modules and/or databases may be stored by and/or maintained in different memory units of autonomous vehicle evaluation system 102 and/or by different computing devices that may form and/or otherwise make up autonomous vehicle evaluation system 102. For example, memory 112 may have, store, and/or include an autonomous vehicle evaluation module 112a, an autonomous vehicle evaluation database 112b, and a machine learning engine 112c. Autonomous vehicle evaluation module 112a may have or store instructions that direct and/or cause autonomous vehicle evaluation system 102 to execute advanced vehicle evaluation techniques, as discussed in greater detail below. Autonomous vehicle evaluation database 112b may store information used by autonomous vehicle evaluation module 112a and/or autonomous vehicle evaluation system 102 in vehicle evaluation and/or in performing other functions. Machine learning engine 112c may have or store instructions that direct and/or cause the autonomous vehicle evaluation system 102 to perform vehicle evaluation and to set, define, and/or iteratively refine optimization rules and/or other parameters used by the autonomous vehicle evaluation system and/or other systems in computing environment 100.

There are many benefits of such autonomous vehicle evaluation system 102. First, the ability to recognize patterns developed by the autonomous driving control system 104 allows the autonomous vehicle evaluation system 102 to perform individual evaluation of these patterns. Additionally, the ability to recognize the evolution of the autonomous driving patterns allows the autonomous vehicle evaluation system 102 to perform evaluation of the improvement of the specific pattern by scoring its effectiveness and the level of safety. Also, the autonomous vehicle evaluation system 102 can be used to generate driving scenarios in the simulator with the advantage that the data may come from the real-word instead of being generated synthetically. In one or more instances, once the learnings are validated, the autonomous vehicle evaluation system 102 may update so that the learnings may be shared with other vehicles in the autonomous vehicle ecosystem.

Figure 2A:
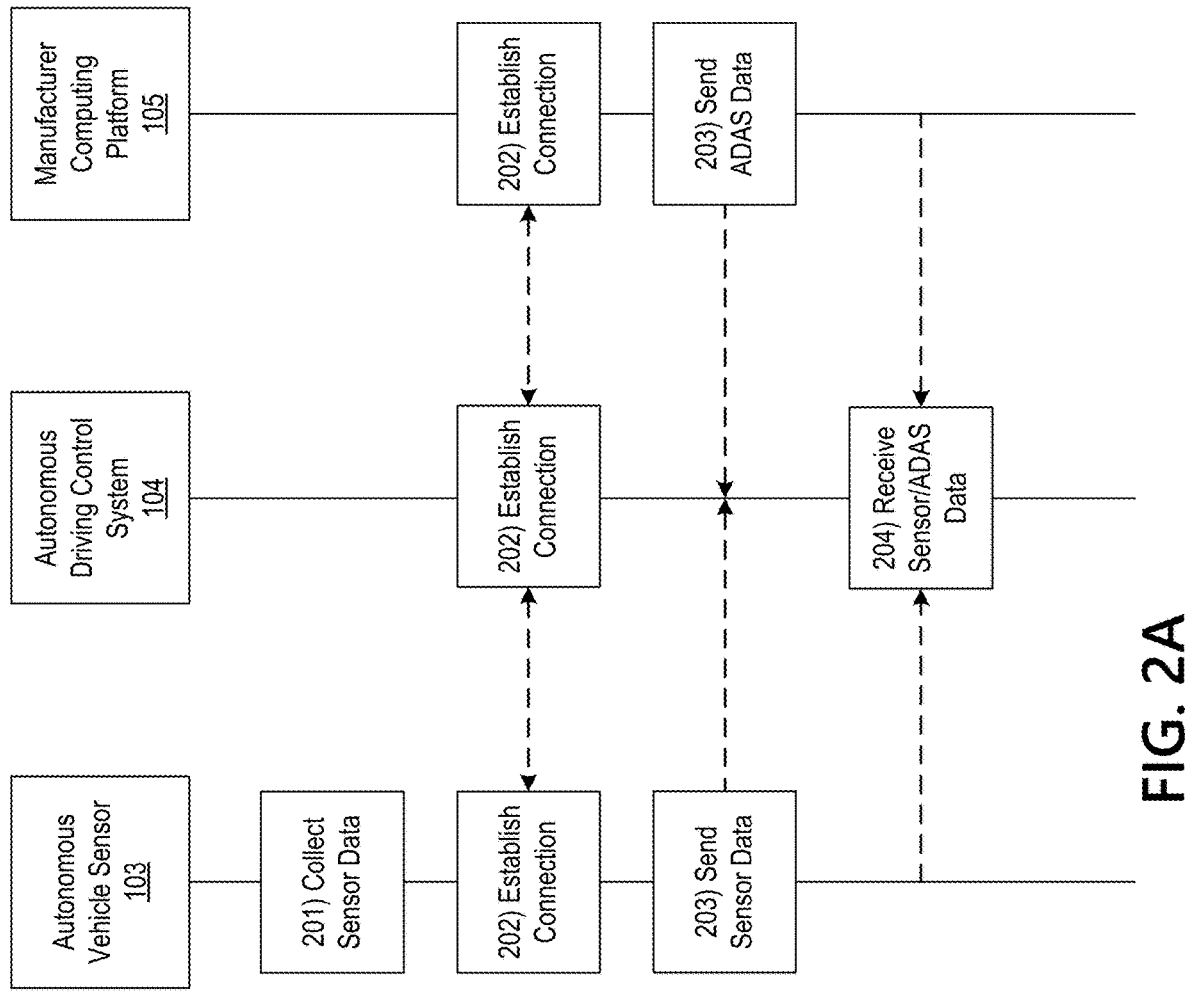
FIGS. 2A-2H depict an illustrative event sequence for deploying an autonomous vehicle evaluation system that performs evaluation of the actions, strategies, preferences, margins, and/or responses of an autonomous driving control system in accordance with one or more example embodiments.
Figure 2A:
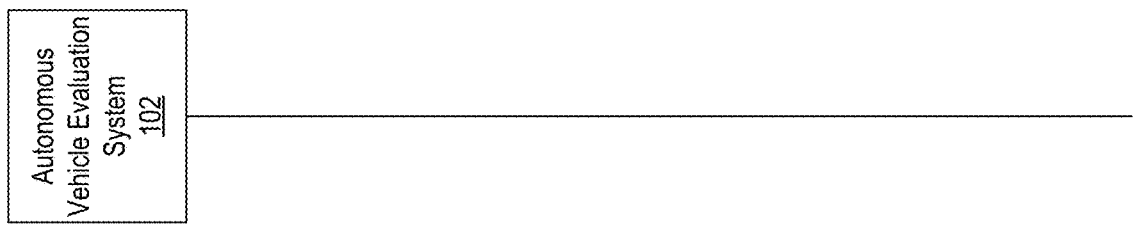

FIGS. 2A-2H depict an illustrative event sequence for deploying an autonomous vehicle evaluation system that performs evaluation of the actions, strategies, preferences, margins, and/or responses of an autonomous driving control system in accordance with one or more example embodiments. Referring to FIG. 2A, at step 201, an autonomous vehicle sensor, such as autonomous vehicle sensor 103, may collect sensor data. For example, the autonomous vehicle sensor 103 may be one or more of an accelerometer, a gyroscope, a thermometer, a motion sensor, a camera, and the like which may be used to collect sensor data corresponding to the environmental scene, the weather, road configuration (number of lanes), the distribution of neighbor vehicles around the ego-vehicle, the acceleration/braking/speed patterns of the neighbor vehicles, the lane changing patterns of neighbor vehicles, the general driving behavior of neighbor vehicles (aggressiveness, attentiveness, etc.), the speed of the ego-vehicle, the road frustration index associated with the neighbor vehicles, the identification of the neighbor vehicle as human or as another autonomous driving system, aggregated traffic density on the road, incidents (like accidents, malfunctioning vehicles, traffic jams, neighbor vehicle cutting-in, vehicle in front performing hard braking, etc.), the presence of pedestrians and bicycles, or the like.

At step 202, the autonomous vehicle sensor 103 may establish a connection with autonomous driving control system 104. For example, the autonomous vehicle sensor 103 may establish a first wireless data connection with the autonomous driving control system 104 to link the autonomous vehicle sensor 103 to the autonomous driving control system 104. In addition, the manufacturer computing platform 105 may establish a connection with autonomous driving control system 104. For example, the manufacturer computing platform 105 may establish a second wireless data connection with the autonomous driving control system 104 to link the manufacturer computing platform 105 to the autonomous driving control system 104.

At step 203, the autonomous vehicle sensor 103 may send the sensor data to the autonomous driving control system 104. For example, the autonomous vehicle sensor 103 may send the sensor data while the first wireless data connection is established. In addition, the manufacturer computing platform 105 may send advanced driver assistance system (ADAS) data to the autonomous driving control system 104. For example, the manufacturer computing platform 105 may send the ADAS data to the autonomous driving control system 104 while the second wireless data connection is established. In these instances, the manufacturer computing platform 105 may send a multitude of information corresponding to vehicle activities (e.g., braking, acceleration, windshield wipers status, blinker status, headlights, or the like) that may inform decision making by the autonomous driving control system 104. In these instances, the manufacturer computing platform 105 may correspond to an ADAS system. In other instances, the ADAS data may be sent from an ADAS system separate from the manufacturer computing platform 105.

At step 204, the autonomous driving control system 104 may receive the sensor data and the ADAS data sent at step 203. For example, the autonomous driving control system 104 may receive the sensor data and the ADAS data (e.g., from the manufacturer computing platform 105, the ADAS system, or the like) via the communication interface 113 and while the first wireless data connection and second wireless data connections, respectively, are established.

Figure 2B:
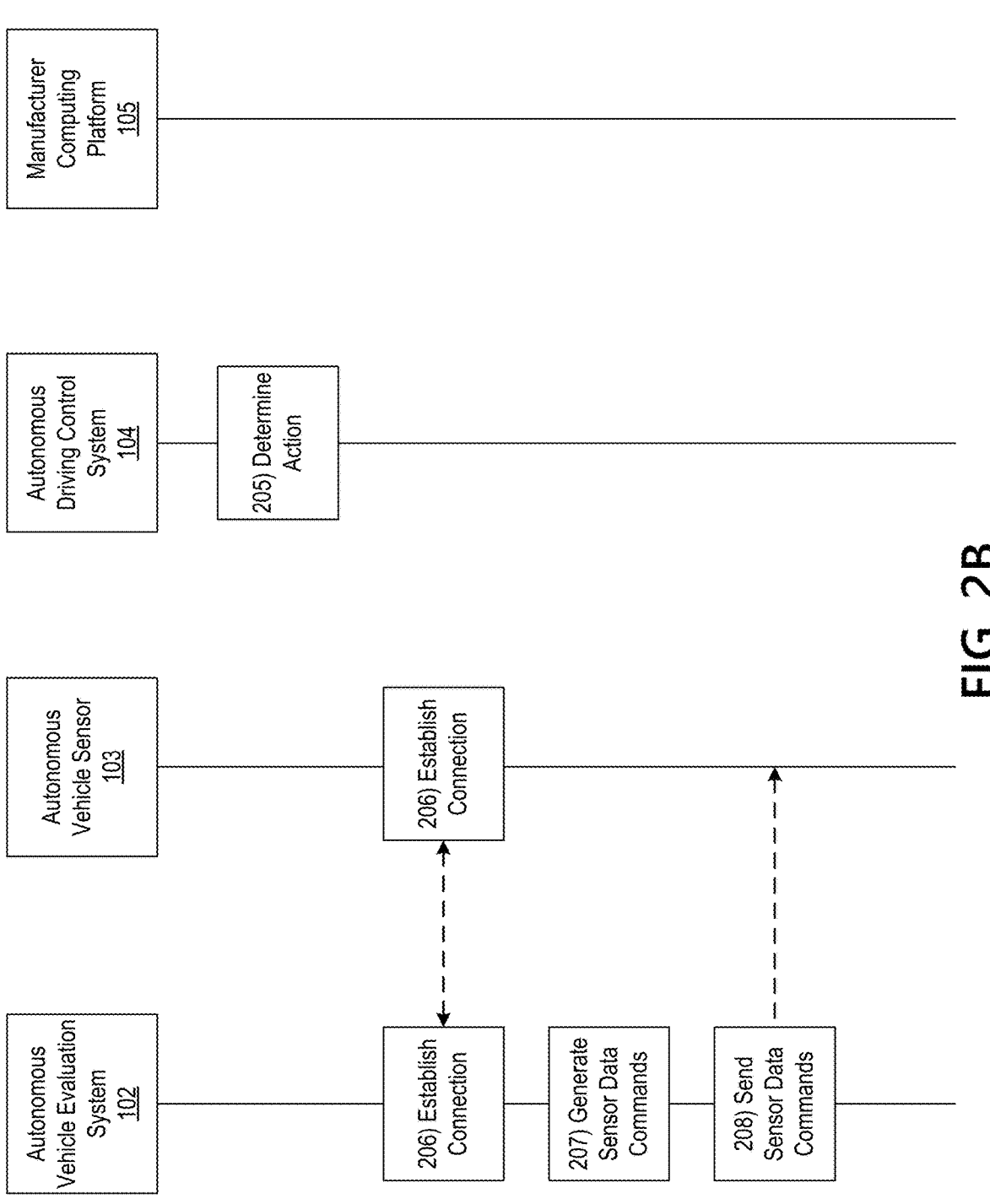

Referring to FIG. 2B, at step 205 the autonomous driving control system 104 may determine an action to perform based on the sensor data and ADAS data received at step 204, and may determine a driving action based on the context. For example, in determining a driving action, the autonomous driving control system 104 may determine a level of speed, the level of acceleration/deceleration, the distance to the leader vehicle, the distance to the vehicle following from behind, lane change, turning, stopping, and the like.

At step 206, autonomous vehicle evaluation system 102 may establish a connection to the autonomous vehicle sensor 103. For example, the autonomous vehicle evaluation system 102 may establish a third wireless data connection with the autonomous vehicle sensor 103 to link the autonomous vehicle evaluation system 102 to the autonomous vehicle sensor 103. In some examples, the sensor data may correspond to an action determined by the autonomous driving control system 104 at step 205.

At step 207, the autonomous vehicle evaluation system 102 may generate one or more commands directing the autonomous vehicle sensor 103 to provide sensor data. For example, in generating the one or more commands, the autonomous vehicle evaluation system 102 may prompt the autonomous vehicle sensor 103 to provide the sensor data sent to the autonomous driving control system at step 203.

At step 208, the autonomous vehicle evaluation system 102 may send the one or more commands directing the autonomous vehicle sensor 103 to provide the sensor data. For example, the autonomous vehicle evaluation system 102 may send the one or more commands while the third wireless data connection is established and via the communication interface 113.

Figure 2C:
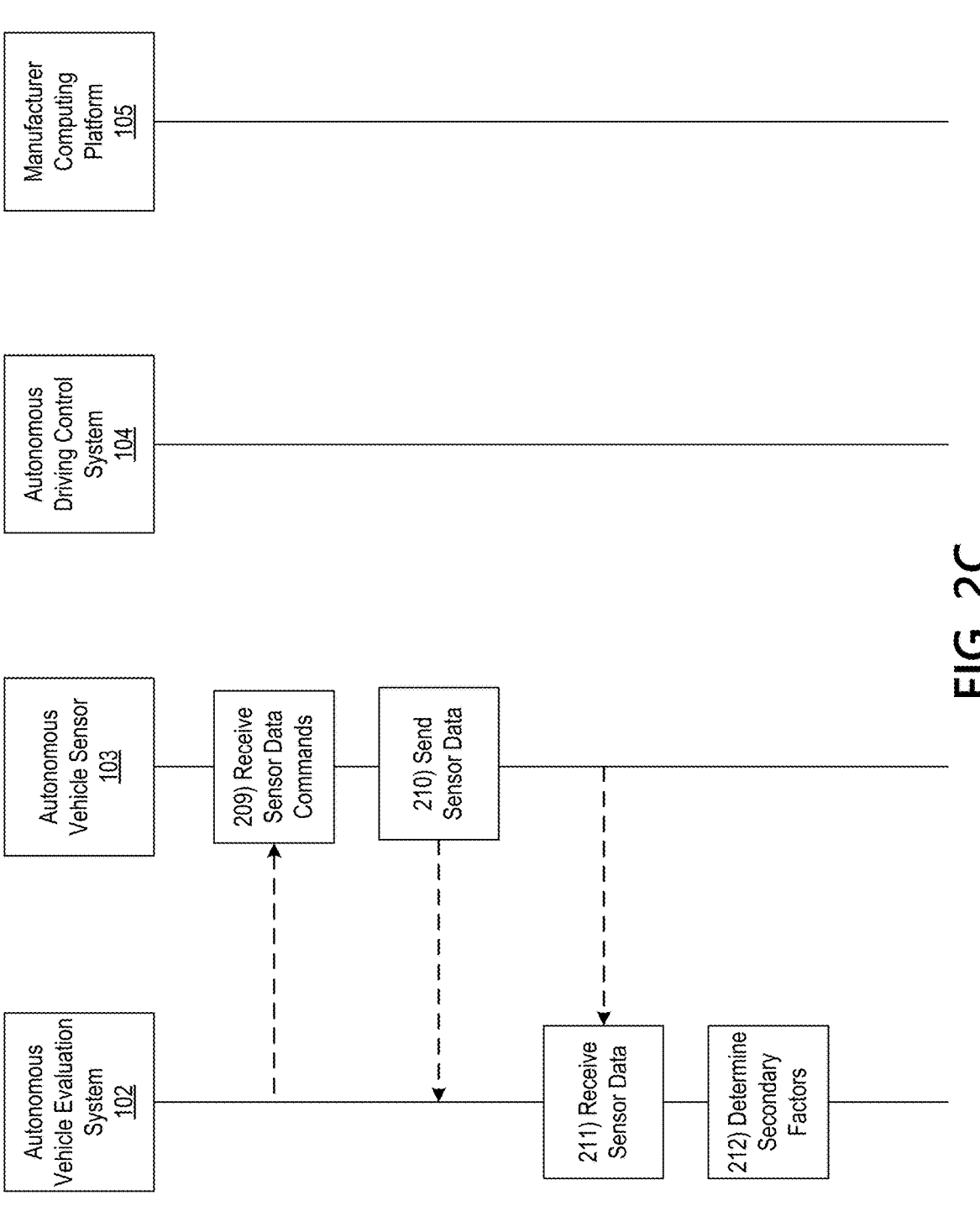

Referring to FIG. 2C, at step 209, the autonomous vehicle sensor 103 may receive the one or more commands sent at step 208. For example, the autonomous vehicle sensor 103 may receive the one or more commands while the third wireless data connection is established.

At step 210, the autonomous vehicle sensor 103 may send the sensor data to the autonomous vehicle evaluation system 102. For example, the autonomous vehicle sensor 103 may send sensor data corresponding to the environmental scene, the weather, road configuration (number of lanes), the distribution of neighbor vehicles around the ego-vehicle, the acceleration/braking/speed patterns of the neighbor vehicles, the lane changing patterns of neighbor vehicles, the general driving behavior of neighbor vehicles (aggressiveness, attentiveness, etc.), the speed of the ego-vehicle, the road frustration index associated with the neighbor vehicles, the identification of the neighbor vehicle as human or as another autonomous driving system, aggregated traffic density on the road, incidents (like accidents, malfunctioning vehicles, traffic jams, neighbor vehicle cutting-in, vehicle in front performing hard braking, etc.), the presence of pedestrians and bicycles, or the like. This sensor data may be referred to as context factors.

In some examples, in addition to sending the sensor data sent to the autonomous driving control system 104 at step 203, the autonomous vehicle sensor data may provide sensor data corresponding to the actions determined by the autonomous driving control system 104. This sensor data may be referred to as action factors.

At step 212, the autonomous vehicle evaluation system 102 may also determine secondary context factors and secondary driving action factors. In some examples, the secondary context factors may be based on the sensor data received at step 211. For example, in determining the secondary context factors, the autonomous vehicle evaluation system 102 may determine more specific elements that provide insights into the perceptual considerations and the different responses that the autonomous driving control system 104 has and develops over time. In determining the secondary context factors, the autonomous vehicle evaluation system may determine: the actual distribution of neighbor vehicle locations around the ego-vehicle, the actual distribution of speeds and accelerations around the ego-vehicle as well as patterns for speed and acceleration from individual vehicles and from the fleet of vehicles, the distribution of pedestrian locations around, the distribution of obstacles (such as construction zones cones, and the like), the distribution of road conflict index around the ego-vehicle, and the distribution of aggressiveness and attentiveness around, the gap that exists on adjacent lanes before performing a lane change, the distribution of vehicles on the intersection (when driving on urban/suburban/rural roads), the heading of the vehicles, and the like. In determining the secondary driving action factors, the autonomous vehicle evaluation system 102 may determine, for example: the turn rate for lane change applied by the autonomous vehicle, the acceleration curve applied when performing a lane change, the speed pattern applied under the given context category, the braking pattern applied, the lane change pattern, pulling to the shoulder, and the like. In one or more instances, the autonomous vehicle evaluation system 102 may determine the secondary driving action factors based on external inputs such as vehicle to vehicle (V2V) communications, vehicle to external (V2X) communications (e.g., vehicle to infrastructure communications, vehicle to drone communications, vehicle to traffic light communications, or the like), or the like.

Figure 2D:
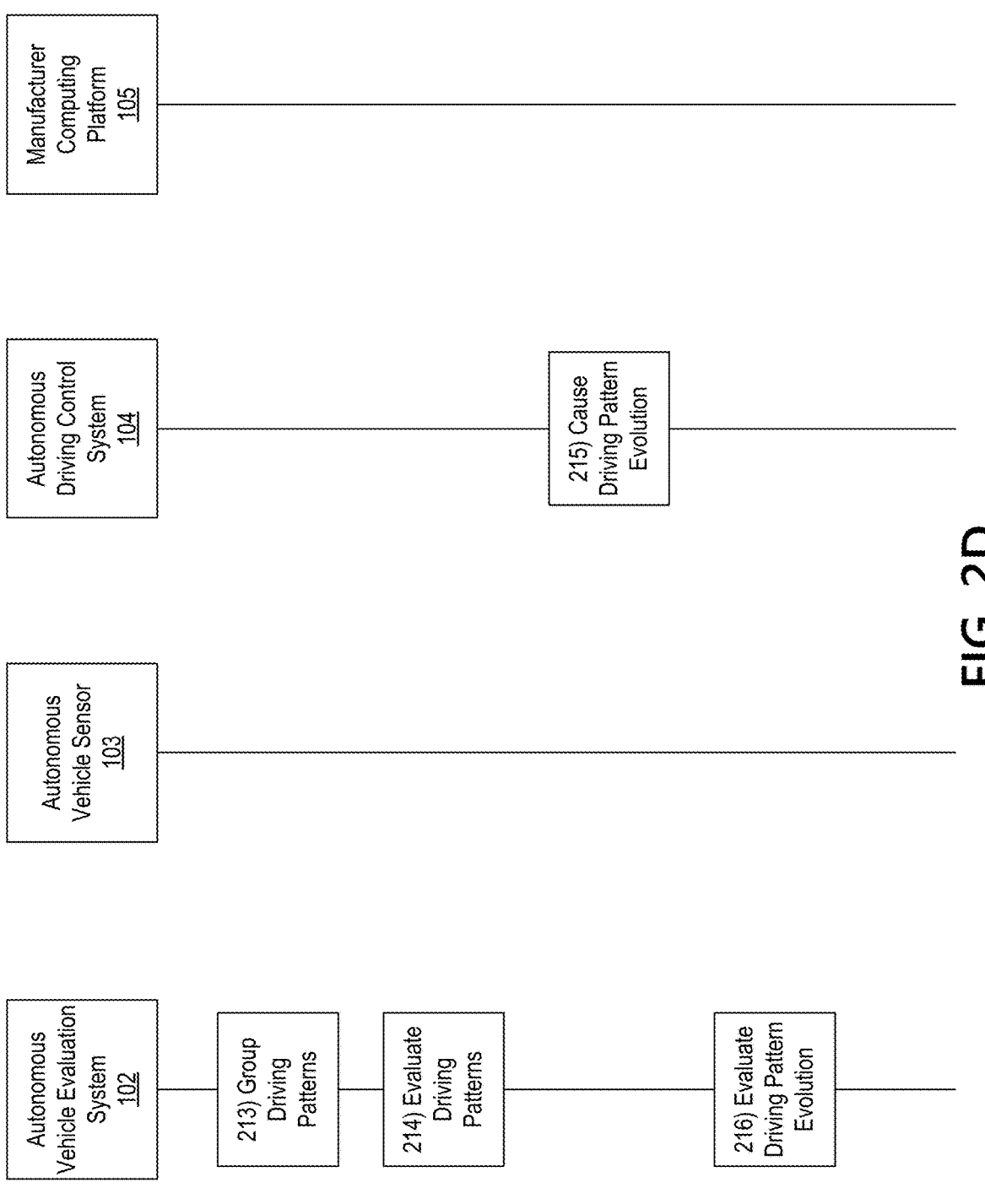

Referring to FIG. 2D, at step 213, the autonomous vehicle evaluation system 102 may determine driving patterns based on the primary and secondary context and action factors described above. In order to perform the evaluations presented in this disclosure, it may be important to recognize the formation of these patterns and in this sense it may be important to cluster/group them. After determining these driving patterns, the autonomous vehicle evaluation system 102 may group or cluster driving patterns that share some common characteristics such as a subset of contextual factors or some driving actions. The driving patterns belonging to the same cluster/category may present some differences. However, the degree of differentiation between driving patterns may be low enough to keep them under the same cluster. The autonomous vehicle evaluation system 102 may apply a criterion that weights the importance of a contextual factor or of a driving action on the differentiation so that such criteria may be responsible for determining the resulting allocation of driving patterns to specific clusters. The clustering and categorization of driving patterns may initially be performed in terms of the primary factors mentioned above. The secondary factors may be absorbed initially on the category (in other words the secondary factors may not be used to define the category) and thus variation among secondary factors within the category is allowed. As the autonomous vehicle evaluation system 102 is exposed to more autonomous system driving actions, some specific arrangements of secondary factors may be identified for some given driving actions. Depending on the detection of more than one special arrangement of secondary factors, the autonomous vehicle evaluation system 102 may trigger the split of the category into two or more categories. This process may be the detection of sub-pattern formation based on secondary factors. In this case the secondary factors that were relevant to the sub-pattern formation may be added to the list of factors that define the category. In some examples, the secondary factors may play an important role in pattern evolution.

In some examples, the criteria for categorization and clustering is flexible and may be modified according to the learning that the autonomous driving control system 104 develops over time. The autonomous driving control system 104 learning may manifest itself on the evolution of the driving patterns.

In some examples, the categorization and clustering may be achieved through a mix of supervised and unsupervised learning for pattern categorization. Initially the categorization may be based on some predetermined clustering criteria. The criteria may determine the degree of differentiation between the context factors and the driving actions that justify a separation of the driving patterns on different categories. In some examples, the criteria may be flexible and there may be some importance weights assigned to such criteria and that may change according to the observed behavior of the autonomous driving control system 104. For instance, if the autonomous driving control system 104 is observed to react by often performing the same type of lane change to a variety of situations, then if these situations were considered initially on different categories then they can be grouped on the same category given that the autonomous driving control system 104 reacts to all of them in the same way 104. In this example, given the flexible criteria, the autonomous vehicle evaluation system 102 may assign lower weight to some of the factors and thus may allow the fusion of categories. Given the flexible criteria it may be possible to perform unsupervised learning based on this criteria and obtain a more representative population of clusters for the given autonomous driving control system. Additionally, as part of the flexibility of the categorization, the autonomous vehicle evaluation system 102 may also perform some splits of the categories.

As part of the evolution of driving patterns, the autonomous driving control system 104 may start developing some level of specialization on some of the driving actions it takes. For example, in case of applying braking patterns in highways, the autonomous driving control system 104 may initially apply the same braking pattern for all the cut-ins that occur and may even evolve this pattern and change how gradual and graceful the deceleration becomes (still the braking pattern is the same for all situations within the category). Nevertheless, it is possible that under some contextual conditions (based on secondary contextual factors) the autonomous vehicle control system 104 may anticipate/predict some cutting-in actions before they occur, and in such cases it may start deceleration before the adjacent neighbor vehicle starts changing heading to perform a cut-in maneuver. In this example, the braking pattern may split into two and the autonomous vehicle evaluation system 102 may discover/learn that the autonomous driving control system 104 has specialized on some of the cut-ins situations and has learned to predict/anticipate the cut-in action in some cases. This may warrant a split of the original corresponding category for cut-ins into two categories (e.g., anticipated/preventive braking in some cases and reactive braking in some other cases) given the specialization achieved by the autonomous driving control system 104. Evolution of the driving patterns and its evaluation are described further below with regard to steps 215 and 216.

The list below is meant to provide an illustration of some example different categories of driving patterns. As mentioned before, the categorization may be based around primary factors. The secondary factors may be absorbed by the category as mentioned previously and thus are not mentioned in the list below. As previously described, instead of influencing categorization the secondary factors are important to detect and track pattern evolution. Although several exemplary driving patterns are described below, this is not meant to be an exhaustive list.

Highway Road Driving Patterns

1) Context: Highway, Sunny weather, 5 lanes, Light Traffic with 5-10 vehicles in the immediate vicinity around ego-vehicle, neighbor speeds distributed around 50 miles/hr, neighbor acceleration distributed around 0.3G, neighbor vehicles performing light braking with a frequency of 1 light brake every 2 minutes, neighbor lane change occurring every 5 minutes, no aggressive driving from neighbors, all neighbor drivers attentive to the road, ego-vehicle moving at 50 miles/hr, no incidents, no pedestrians, no bicycles.

Driving Actions: ego-vehicle speed maintained at 50 miles/hr, zero acceleration, keeping at least 10 meters from leading vehicle, no lane change, no turning, no stopping.

Outcome: The ego-vehicle maintains a speed of 50 miles/hr and all the factors of the context are maintained without change (very low risk, high success).

2) Context: Highway, Sunny weather, 5 lanes, Moderate Traffic with 10-20 vehicles in the immediate vicinity around ego-vehicle, neighbor speeds distributed around 40 miles/hr, neighbor acceleration distributed around 10 m/sec2, neighbor vehicles performing light braking with a frequency of 1 light brake every minute, neighbor lane change occurring every 2 minutes, no aggressive driving from neighbors, all neighbor drivers attentive to the road, ego-vehicle moving at 40 miles/hr, no incidents, no pedestrians, no bicycles.

Driving Actions: ego-vehicle speed maintained at 40 miles/hr, zero acceleration, keeping at least 6 meters from leading vehicle, no lane change, no turning, no stopping.

Outcome: The ego-vehicle maintains a speed of 40 miles/hr and all the factors of the context are maintained without change (very low risk, high success).

3) Context: Highway, Sunny weather, 5 lanes, Moderate Traffic with 10-20 vehicles in the immediate vicinity around ego-vehicle, neighbor speeds distributed around 40 miles/hr, neighbor acceleration distributed around 10 m/sec2, neighbor vehicles performing light braking with a frequency of 1 light brake every minute, neighbor lane change occurring every 2 minutes, no aggressive driving from neighbors, all neighbor drivers attentive to the road, ego-vehicle moving at 40 miles/hr, no incidents, no pedestrians, no bicycles.

Driving Actions: ego-vehicle speed maintained at 40 miles/hr, zero acceleration, keeping at least 6 meters from leading vehicle, one lane change to keep distance to front vehicle at 6 meters, no turning, no stopping.

Outcome: After lane change the ego-vehicle maintains a speed of 40 miles/hr and all the factors of the context are maintained without change (very low risk, high success).

This category of driving pattern includes variations of the lane change action (e.g., change to the left-lane or to the right lane) given that the purpose of the change was to maintain a safe distance. This category also includes some degree of variation around the context factors mentioned above all of which are considered inside the same cluster and thus inside the same category. In this category/cluster of driving pattern the autonomous vehicle evaluation system 102 is able to infer what was the purpose of the lane change (thus the autonomous vehicle evaluation system performs discovery and categorization).

4) Context: Highway, Sunny weather, 5 lanes, Moderate Traffic with 10-20 vehicles in the immediate vicinity around ego-vehicle, neighbor speeds distributed around 40 miles/hr, neighbor acceleration distributed around 10 m/sec2, neighbor vehicles performing light braking with a frequency of 1 light brake every minute, neighbor lane change occurring every 2 minutes, no aggressive driving from neighbors, all neighbor drivers attentive to the road, ego-vehicle moving at 40 miles/hr, neighbor vehicle in front performs light brake, no pedestrians, no bicycles.

Driving Actions: After braking resulting ego-vehicle speed maintained at 40 miles/hr, in response to neighbor vehicle ego-vehicle performs light brake (de-acceleration) to keep safe distance to front vehicle, keeping at least 6 meters from leading vehicle, no lane change, no turning, no stopping.

Outcome: After braking, the ego-vehicle maintains a distance of 6 meters to front vehicle, subsequently resumes to previous speed of 40 miles/hr and all the other factors of the context are maintained without change (low risk, high success).

5) Context: Highway, Sunny weather, 5 lanes, Heavy Traffic with 20-30 vehicles in the immediate vicinity around ego-vehicle, neighbor speeds distributed around 30 miles/hr, neighbor acceleration distributed around 10 m/sec2, neighbor vehicles performing light braking with a frequency of 1 light brake every 20 seconds, neighbor lane change occurring every minute, no aggressive driving from neighbors, all neighbor drivers attentive to the road, ego-vehicle moving at 30 miles/hr, neighbor vehicle in adjacent lane moves to the lane of ego-vehicle in non-aggressive way, no pedestrians, no bicycles.

Driving Actions: Resulting ego-vehicle speed maintained at 30 miles/hr, moderate brake (de-acceleration) to keep safe distance to the incoming front vehicle, keeping at least 4 meters from leading vehicle, no lane change, no turning, no stopping.

Outcome: After braking the ego-vehicle maintains a distance of 4 meters to front vehicle, subsequently resumes to previous speed of 30 miles/hr and all the other factors of the context are maintained without change (low risk, high success).

6) Context: Highway, Sunny weather, 5 lanes, Heavy Traffic with 20-30 vehicles in the immediate vicinity around ego-vehicle, neighbor speeds distributed around 30 miles/hr, neighbor acceleration distributed around 10 m/sec2, neighbor vehicles performing light braking with a frequency of 1 light brake every 20 seconds, neighbor lane change occurring every minute, detected aggressive driving from 1 neighbor in adjacent lane, all neighbor drivers attentive to the road, ego-vehicle moving at 30 miles/hr, no incidents, no pedestrians, no bicycles.

Driving Actions: Resulting ego-vehicle speed maintained at 30 miles/hr, zero acceleration, keeping at least 4 meters from leading vehicle, lane change to move away from aggressive driver, no turning, no stopping.

Outcome: After lane change the ego-vehicle maintains a distance of 4 meters to the front vehicle, keeps speed of 30 miles/hr and all the other factors of the context are maintained without change (low risk, high success).

In this category/cluster the autonomous vehicle evaluation system 102 infers the purpose of the lane change, which is to maintain a safe distance from the aggressive driver. This category includes all the actions performed by the ego-vehicle that are aimed at avoiding aggressive drivers and maintaining a safe distance from them. The actions include reduction of speed and one or more lane changes. This category also includes some degree of variation for the context (for example variations around the frequency of light brake, the number of lanes on the road, or variations on the number of aggressive drivers).

7) Context: Highway, Sunny weather, 5 lanes, Heavy Traffic with 20-30 vehicles in the immediate vicinity around ego-vehicle, neighbor speeds distributed around 30 miles/hr, neighbor acceleration distributed around 10 m/sec2, neighbor vehicles performing light braking with a frequency of 1 light brake every 20 seconds, neighbor lane change occurring every minute, no aggressive driving from neighbors, one neighbor driver in an adjacent lane is distracted, ego-vehicle moving at 30 miles/hr, no incidents, no pedestrians, no bicycles.

Driving Actions: Resulting ego-vehicle speed maintained at 30 miles/hr, zero acceleration, keeping at least 4 meters from leading vehicle, lane change to move away from distracted driver, no turning, no stopping.

Outcome: After lane change the ego-vehicle maintains a distance of 4 meters to the front vehicle, keeps speed of 30 miles/hr and all the other factors of the context are maintained without change (low risk, high success).

In this category/cluster the autonomous vehicle evaluation system 102 infers the purpose of the lane change, which is to maintain a safe distance from the distracted driver. Additionally the distracted driver is detected based on his driving actions (for example detecting abrupt braking performed by the distracted driver as a result of braking of the vehicle in front of him). This category includes all the actions performed by the ego-vehicle that are aimed at avoiding distracted drivers and maintaining a safe distance from them. The actions include reduction of speed and one or more lane changes. This category also includes some degree of variation for the context (for example variations around the frequency of light brake, or variations on the number of distracted drivers).

8) Context: Highway, Sunny weather, 5 lanes, Heavy Traffic with 20-30 vehicles in the immediate vicinity around ego-vehicle, neighbor speeds distributed around 10 miles/hr, neighbor acceleration distributed around 10 m/sec2, neighbor vehicles performing light braking with a frequency of 1 light brake every 20 seconds, neighbor lane change occurring every minute, no aggressive driving from neighbors, all neighbor drivers attentive to the road, ego-vehicle moving at 30 miles/hr, traffic accident scene down the road, no pedestrians, no bicycles.

Driving Actions: Resulting ego-vehicle speed maintained at 10 miles/hr, zero acceleration, keeping at least 2 meters from leading vehicle, no lane change, no turning, no stopping.

Outcome: The ego-vehicle maintains a distance of 2 meters to the front vehicle, keeps speed of 10 miles/hr and all the other factors of the context are maintained without change (low risk, high success).

This category is important because it is clear that the pattern shows that the autonomous driving control system 104 takes no action except to follow the imposed flow of traffic. Thus there is no lane change action intended to improve the driving speed. This could change however with time. The autonomous vehicle evaluation system 102 will certainly identify if there is behavioral change on the autonomous driving control system and it will evaluate the risk and level of success or failure of such modified behavior. Similarly to previous categories some variation on the contextual factors is allowed within this category.

9) Context: Highway, Sunny weather, 5 lanes, Heavy Traffic with 20-30 vehicles in the immediate vicinity around ego-vehicle, neighbor speeds distributed around 10 miles/hr, neighbor acceleration distributed around 10 m/sec2, neighbor vehicles performing light braking with a frequency of 1 light brake every 20 seconds, neighbor lane change occurring every minute, no aggressive driving from neighbors, all neighbor drivers attentive to the road, ego-vehicle moving at 30 miles/hr, vehicle from adjacent lane cuts-in front of ego-vehicle within 2 meters, no pedestrians, no bicycles.

Driving Actions: Ego-vehicle speed reduced below 5 miles/hr, de-acceleration applied, keeping at least 2 meters from leading vehicle, no lane change, no turning, no stopping.

Outcome: The ego-vehicle de-accelerates promptly to maintain a distance as safe as possible from the vehicle cutting-in. The ego-vehicle also attempts gradual deceleration to avoid being hit from back. After the driving action the vehicle maintains a distance of 2 meters to the front vehicle, keeps speed below 5 miles/hr and all the other factors of the context are maintained without change (moderate risk, success).

This category includes all cuts-in from adjacent vehicles that occur at low speed and within 2 meters in front of ego-vehicle (moderate risk). The obvious driving action is to de-accelerate, however a lane change could also occur. The autonomous vehicle evaluation system 102 observes the dominant driving action under this pattern and it also detects if this pattern evolves over time by incorporating other driving actions. The level of risk and the improvement or deterioration of the driving action performance is evaluated. Similarly, other more aggressive cut-in driving patterns are evaluated and compared to this driving pattern. If the driving actions are very different then the patterns are allocated on different categories. This allows proper evaluation and proper simulation of the driving pattern if simulation is subsequently performed to assess and predict the risk for future driving scenarios. Similarly, the patterns for how gradual the de-acceleration was and the response time exhibited by the ego-vehicle are absorbed within this category.

10) Context: Highway, Sunny weather, 5 lanes, Heavy Traffic with 20-30 vehicles in the immediate vicinity around ego-vehicle, neighbor speeds distributed around 10 miles/hr, neighbor acceleration distributed around 10 m/sec2, neighbor vehicles performing light braking with a frequency of 1 light brake every 20 seconds, neighbor lane change occurring every minute, no aggressive driving from neighbors, all neighbor drivers attentive to the road, ego-vehicle moving at 30 miles/hr, no incidents, no pedestrians, no bicycles.

Driving Actions: Ego-vehicle speed at 10 miles/hr, zero acceleration, keeping at least 2 meters from leading vehicle, lane change to improve driving speed, no turning, no stopping.

Outcome: The ego-vehicle changes lanes after the autonomous system assessment indicates that this is a safe maneuver. The gap (unoccupied distance or opening) that exists on an adjacent lane in order to perform the lane change is large enough to warrant a safe lane change. In this case the evaluation system keeps record of the gap involved in this driving action. In this case this is a unilateral action taken by the autonomous vehicle rather than a reaction to another neighbor vehicle's actions. After lane change the ego-vehicle improves its speed to 15 miles/hr and maintains a distance of 2 meters to the front vehicle, and all the other factors of the context are maintained without change (moderate risk, success).

The autonomous vehicle evaluation system 102 discovers the purpose of this driving action (e.g., improving driving speed). This category includes all lane changes with the purpose of improving driving speed. The category will accept variations on some of the context factors.

Urban Road Driving Patterns

1) Context: Urban, Sunny weather, 2 lanes, Light Traffic with 3 vehicles in the immediate vicinity around ego-vehicle, neighbor speeds distributed around 30 miles/hr, neighbor acceleration distributed around 0.3G, neighbor vehicles performing light braking with a frequency of 1 light brake every 15 seconds, neighbor lane change occurring every 30 seconds, no aggressive driving from neighbors, all neighbor drivers attentive to the road, ego-vehicle moving at 30 miles/hr, no incidents, no pedestrians, no bicycles.

Driving Actions: ego-vehicle speed maintained at 30 miles/hr, zero acceleration, keeping at least 3 meters from leading vehicle, no lane change, no turning, no stopping.

Outcome: The ego-vehicle maintains a speed of 30 miles/hr and all the factors of the context are maintained without change (very low risk, high success).

2) Context: Urban, Sunny weather, 2 lanes, Light Traffic with 3 vehicles in the immediate vicinity around ego-vehicle, neighbor speeds distributed around 30 miles/hr, neighbor acceleration distributed around 0.3G, neighbor vehicles performing light braking with a frequency of 1 light brake every 15 seconds, neighbor lane change occurring every 30 seconds, no aggressive driving from neighbors, all neighbor drivers attentive to the road, ego-vehicle moving at 30 miles/hr, light braking from front vehicle, no pedestrians, no bicycles.

Driving Actions: After braking ego-vehicle speed maintained at 30 miles/hr, in response to neighbor vehicle ego-vehicle performs light brake (de-acceleration) to keep safe distance to front vehicle, keeping at least 3 meters from leading vehicle, no lane change, no turning, no stopping.

Outcome: After braking the ego-vehicle maintains a distance of 3 meters to front vehicle, subsequently resumes to previous speed of 30 miles/hr and all the other factors of the context are maintained without change (low risk, high success).

3) Context: Urban, Sunny weather, 2 lanes, Light Traffic with 3 vehicles in the immediate vicinity around ego-vehicle, neighbor speeds distributed around 30 miles/hr, neighbor acceleration distributed around 0.3G, neighbor vehicles performing light braking with a frequency of 1 light brake every 15 seconds, neighbor lane change occurring every 30 seconds, no aggressive driving from neighbors, all neighbor drivers attentive to the road, ego-vehicle moving at 30 miles/hr, no incidents, no pedestrians, no bicycles.

Driving Actions: After braking (at intersection) ego-vehicle resumes speed at 30 miles/hr, temporal braking and acceleration due to turning, keeping at least 3 meters from leading vehicle, no lane change, right turn at intersection with green light, no stopping.

Outcome: After performing the right turn the ego-vehicle resumes its previous speed (low risk, high success).

This category will include all the right turns with green traffic light. Some variations in terms of contextual factors such as number of neighbor vehicles, neighbor vehicle speed, etc., will be absorbed by this category.

4) Context: Urban, Sunny weather, 2 lanes, Light Traffic with 3 vehicles in the immediate vicinity around ego-vehicle, neighbor speeds distributed around 30 miles/hr, neighbor acceleration distributed around 0.3G, neighbor vehicles performing light braking with a frequency of 1 light brake every 15 seconds, neighbor lane change occurring every 30 seconds, no aggressive driving from neighbors, all neighbor drivers attentive to the road, ego-vehicle moving at 30 miles/hr, no incidents, no pedestrians, no bicycles.

Driving Actions: After braking (at intersection) ego-vehicle resumes speed at 30 miles/hr, temporal braking and acceleration due to turning, keeping at least 3 meters from leading vehicle, no lane change, right turn at intersection with stop sign, stopping.

Outcome: After waiting for other vehicles that have right of pass the ego-vehicle performs a right turn. After performing the right turn the ego-vehicle resumes its previous speed (low risk, high success).

This category will include all the right turns with stop sign. Some variations in terms of contextual factors such as number of neighbor vehicles, neighbor vehicle speed, etc., will be absorbed by this category. Similarly, different derivative driving actions such as stopping in the middle of the turn maneuver to prevent collision with another unexpected vehicle that didn't respect the right of pass are absorbed by this category. These incidents that could happen in the middle of the maneuver are part of this driving pattern within this category.

5) Context: Urban, Sunny weather, 2 lanes, Heavy Traffic with 5 vehicles in the immediate vicinity around ego-vehicle, neighbor speeds distributed around 30 miles/hr, neighbor acceleration distributed around 0.3G, neighbor vehicles performing light braking with a frequency of 1 light brake every 15 seconds, neighbor lane change occurring every 30 seconds, no aggressive driving from neighbors, all neighbor drivers attentive to the road, ego-vehicle moving at 30 miles/hr, neighbor vehicle in adjacent lane cuts-in front of ego-vehicle, no pedestrians, no bicycles.

Driving Actions: Ego-vehicle reduces speed to 15 miles/hr, de-acceleration to keep safe distance from vehicle in front that is cutting-in, keeping at least 3 meters from leading vehicle, no lane change, no turning, no stopping.

Outcome: After de-accelerating to keep a safe distance from vehicle that cuts-in front the ego-vehicle resumes to previous speed of 30 miles/hr (moderate risk, high success).

This category will include different patterns for de-acceleration performed (for instance how gradual the deceleration/braking was) as well as different patterns for the response time (how soon after the cutting-in happened the de-acceleration started, and if there was any preventive deceleration that started before the actual brake-in occurred in anticipation of the neighbor's risky maneuver). Some variations in terms of contextual factors such as number of neighbor vehicles, neighbor vehicle speed, etc., will be absorbed by this category.

Rural Road Driving Patterns

1) Context: Rural, Sunny weather, 1 lane, Moderate Traffic with 2 vehicles in the immediate vicinity around ego-vehicle (one in front and one behind), neighbor speeds distributed around 30 miles/hr, neighbor acceleration distributed around 0.1G, neighbor vehicles performing occasional braking with a frequency of 1 light brake every 10 minutes, no neighbor lane change since there is only one lane, no aggressive driving from neighbors, all neighbor drivers attentive to the road, ego-vehicle moving at 30 miles/hr, no incidents, no pedestrians, no bicycles.

Driving Actions: ego-vehicle speed maintained at 30 miles/hr, zero acceleration, keeping at least 6 meters from leading vehicle, no lane change, no turning, no stopping.

Outcome: The ego-vehicle maintains a speed of 30 miles/hr and all the factors of the context are maintained without change (very low risk, high success).

2) Context: Rural, Sunny weather, 1 lane, Moderate Traffic with 2 vehicles in the immediate vicinity around ego-vehicle (one in front and one behind), neighbor speeds distributed around 30 miles/hr, neighbor acceleration distributed around 0.1G, neighbor vehicles performing occasional braking with a frequency of 1 light brake every 10 minutes, no neighbor lane change since there is only one lane, no aggressive driving from neighbors, all neighbor drivers attentive to the road, ego-vehicle moving at 30 miles/hr, hard brake from neighbor vehicle in front, no pedestrians, no bicycles.

Driving Actions: Ego-vehicle speed reduced at 10 miles/hr, gradual de-acceleration, keeping at least 3 meters from leading vehicle, no lane change, no turning, no stopping.

Outcome: In response to a hard brake from vehicle in front the ego-vehicle applies gradual de-acceleration so that the vehicle from behind will have a better opportunity to adjust to the sudden event and will have some time-window to respond by braking gradually as well and thus a collision from the back is avoided. After ego-vehicle and the vehicle following from behind complete their braking maneuvers the ego-vehicle resumes previous speed of 30 miles/hr and all the factors of the context are maintained without change (high risk, high success).

This category includes all possible hard-brake incidents that could occur in front of the ego-vehicle and the braking patterns applied in such cases. Variations on the contextual factors (such as having one or more vehicles behind the vehicle that follows from behind) are absorbed within this category as well.

At step 214, the autonomous vehicle evaluation system 102 may perform adaptive evaluation of the driving patterns grouped at step 213. In some examples, the evaluation of braking patterns may be achieved through the assessment of the outcome of the driving actions. For example, in a leader-follower driving scenario, when the leader vehicle brakes, the follower may brake as well. This action may have an outcome. In this example, the outcome is what is the new state of the ego-vehicle after applying such driving action. The final distance to the leader vehicle may be one measure of the success and an indicator of the level of risk of such action. The level of deceleration involved on the action may be another indicator of the degree of success and risk involved. The evaluation may involve a risk model that may assess the degree of safety of the driving actions. Additionally, an assessment of effectiveness of the driving action may be performed. The effectiveness assessment may evaluate the degree of success or failure to achieve the intended objective of the driving action (such objective may be inferred by the evaluation system and may be obtained by identifying, based on the ego-vehicle's trajectory, speed, and acceleration, the intended target position and final speed and acceleration) and it may also assess the degree of improvement that such driving action adds to the overall trip (for instance the evaluation of a lane change action may determine if the resulting driving speed achieved by this action has been increased or not while maintaining the same or a better level of safety).

In some examples, the parameters for evaluation may be predefined but also they may be modified and adapted by the autonomous vehicle evaluation system 102 given the context involved in the driving action. Detection of anomalies in the context surrounding the ego-vehicle may allow the autonomous vehicle evaluation system 102 to auto-discover additional parameters for evaluation. The anomalies may be detected by applying unsupervised learning which may allow the autonomous vehicle evaluation system 102 to compare the driving action and its context against previous driving actions and their contexts (or by comparing to some template driving actions with their context stored in memory) and single-out specific components or events involved in the context surrounding the driving action that generates a significant differentiation with respect to previous driving events. For instance, the braking action may involve a vehicle from the back getting dangerously close to the ego-vehicle. This may be detected as a special braking action and thus the evaluation should include a parameter that evaluates what is the final distance between the ego-vehicle and the vehicle that was following in the back. In this example, the new contextual component may be the vehicle that was following from behind.

In another example, when performing a lane change on an urban street the ego-vehicle may face a situation where a pedestrian is attempting to cross the street at a non-allowed location. Even though this may be an illegal maneuver by the pedestrian, it is still a valid and possible event that could happen and the response from the autonomous vehicle matters. This may be an unexpected situation and the anomaly of having a pedestrian being detected when performing the lane change may introduce a new component on this driving action which may make it unique (provided that it did not happen before). Therefore, the new component which is the pedestrian may trigger a new set of parameters for evaluation which may be included on the autonomous-vehicle braking pattern evaluation. The parameters may be the final closest distance to the pedestrian, speed level when passing pedestrian, and the like. This may allow the autonomous vehicle evaluation system 102 to extend the evaluation and consider all the factors involved. In such situations, use of an intelligent evaluation system may be advantageous over rigid and nonflexible and non-adaptable evaluation systems based on rigid pre-defined metrics for an autonomous driving technology that adapts to new situations.

At step 215, the autonomous driving control system 104 may adapt and improve based on its previous experience. For example, the autonomous driving control system 104 may cause driving patterns to evolve based on actions taken in the past, such as the actions taken at step 205 based on the sensor data received. For example, the autonomous driving control system 104 may include modules for self-improvement and it may learn from previous experiences that may provide the autonomous driving control system 104 with information on the outcome of the different driving actions performed in the past. In some examples, the different driving patterns may include information that allows the autonomous vehicle evaluation system 102 to track the modification of the autonomous driving control response. The more granular aspects of the driving pattern (the secondary factors) may provide information used to characterize the modification of the autonomous driving control response. Driving patterns may evolve in several different ways.

In a first example, the autonomous driving control system 104 may modify secondary driving action factors within the category. For example, under a given category for a lane change, the autonomous driving control system 104 may apply a certain level of acceleration. Given previous experiences, the autonomous driving control system may realize that it is actually safer to increase the acceleration level and complete the lane change in a shorter period of time for all the arrangements of secondary factors within the category. This driving pattern modification may be tracked by the autonomous vehicle evaluation system 102 and the corresponding assessment under the risk model and the degree of effectiveness may be obtained. Similarly, the discovery of this pattern modification may contribute to the assessment of the autonomous driving control system's level of adaptability.

In a second example, the autonomous driving control system 104 may cause a driving pattern to evolve by generating sub-patterns within the category. The sub-patterns are different arrangements of secondary factors within the category. For example, the autonomous driving control system 104 may develop two levels of acceleration for two different driving scenarios of a lane change maneuver within the category. For example, in one scenario when performing a lane change and a vehicle from behind on the target lane is within six meters the autonomous vehicle learns that it is safer to perform this lane change faster and thus may increase the acceleration while doing the lane change. Under a different driving scenario within the same category, the target lane has no vehicles behind and the autonomous driving control system 104 instructs the vehicle to perform the lane change with a lower level of acceleration compared to the scenario mentioned above. This case shows that the driving pattern may evolve into two driving sub-patterns and this modification may be discovered by the autonomous vehicle evaluation system 102. Under this situation, the corresponding assessment of risk, effectiveness and adaptability is performed by the autonomous vehicle evaluation system 102. Similarly, as mentioned above this situation may warrant the split of the original category into two categories.

In a third example, the autonomous driving control system 104 may cause a driving pattern to evolve by substituting one or more of the secondary factors originally involved in the category. For example, the autonomous vehicle evaluation system 102 may discover that the autonomous driving control system 104 modifies the response to the presence of aggressive drivers on highways by reducing speed rather than by doing lane changes. The autonomous vehicle evaluation system 102 may discover this evolution based on the autonomous driving control system's 104 driving pattern and thus it may assess the risk and effectiveness from the outcomes observed while the ego-vehicle applies these driving actions. Based on the previous outcomes obtained for this driving pattern the autonomous vehicle evaluation system 102 may provide a measure of the improvement or of the worsening for this specific pattern's performance.

In some examples, the autonomous driving control system 104 may notify the autonomous vehicle evaluation system 102 of the driving pattern evolution. In other examples, the autonomous vehicle evaluation system 102 may continually monitor the autonomous driving control system 104, and thus may determine when the autonomous driving control system 104 is performing the driving pattern evolution and what actions are being taken as a result.

At step 216, the autonomous vehicle evaluation system 102 may evaluate the ability of the autonomous driving control system 104 to adapt and perform self-improvement. For example, based on a history of previously detected driving patterns it is possible for the autonomous vehicle evaluation system 102 to assess if the autonomous driving control system 104 is responding/acting in the same way or if some modification to the pattern has been introduced. The autonomous vehicle evaluation system 102 may detect, record the modifications and assess the performance. If the autonomous driving control system 104 typically reacts/ responds in the same way over time given a driving pattern, (the pattern may present some degree of variation on the associated context from time to time) then the autonomous vehicle evaluation system 102 may learn/discover that no learning is happening for this specific pattern. The fact that no learning is happening may be an issue since this will indicate that, under variations of the context corresponding to the driving pattern, adaptation may not occur, and this may be aggravated if the evaluation of this driving pattern shows worsening outcomes, and thus degradation. The inability to adapt may be problematic since artificial intelligence systems may not be trained and evaluated for every possible situation that may be faced under real-world conditions. In this sense, an autonomous driving control system that shows rigidity and inability to change may be particularly vulnerable for all or for a subset of the driving patterns within the spectrum of possible driving scenarios. Therefore, the ability of the autonomous vehicle evaluation system 102 to assess how adaptable the autonomous driving control system is to new driving scenarios is advantageous.

The autonomous vehicle evaluation system 102 may generate learning curve characterizations for the autonomous driving control system 104 and may assess the degree of plasticity (or in other words the degree to which the autonomous driving control system 104 may modify itself). Additionally, as described above, the autonomous vehicle evaluation system 102 may also assess whether these self-modifications are effective and if they improve the safety and reduce the risk. In doing so, the autonomous vehicle evaluation system 102 determines to what degree the autonomous driving control system 102 is able to learn and modify itself in an effective and safe fashion.

Figure 2E:
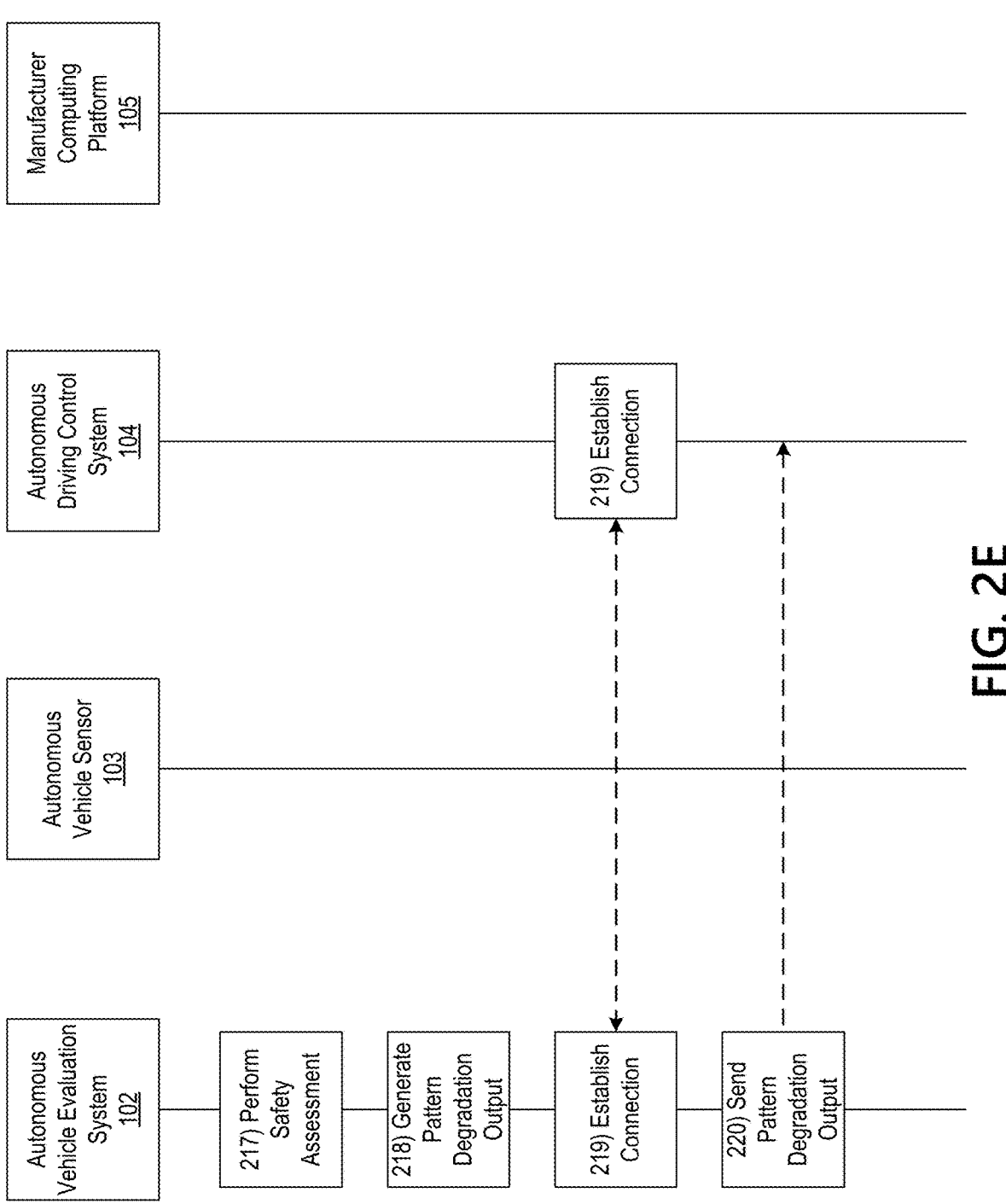

Referring to FIG. 2E, at step 217, the autonomous vehicle evaluation system 102 may perform a safety assessment of the driving patterns corresponding to the autonomous driving control system 104. For example, based on the ability of the autonomous vehicle evaluation system 102 to discover the different driving action patterns it may be possible to categorize them, assess the improvements as these patterns evolve through time by tracking the variation in the level of risk as the patterns evolve. In this sense, it is plausible that due to the self-modification that the autonomous driving control system 104 applies, these patterns may perform worse over time. The autonomous vehicle evaluation system 102 may detect an increased risk of collision as a result of the assessment of the patterns as they evolve over time. The autonomous vehicle evaluation system 102 may single-out these patterns that are found to degrade over time and may take some preventive and cautionary actions.

At step 218, the autonomous vehicle evaluation system 102 may generate a pattern degradation output. For example, in generating the pattern degradation output, the autonomous vehicle evaluation system 102 may generate an alert to a manufacturer of the autonomous driving control system indicating that one or more driving patterns are degrading. This may allow a manufacturer to learn about the degrading pattern before a regrettable outcome occurs. In another example, in generating the pattern degradation output, the autonomous vehicle evaluation system 102 may provide the context corresponding to a degrading driving pattern. This may allow a simulator (provided by a third party or by the autonomous system manufacturer) to generate different driving scenarios similar to the one associated with the degrading pattern and to assess the potential autonomous driving control system 104 response and the predicted outcome and predicted safety output. This may allow the manufacturer to obtain valuable information about a degrading pattern that, if deemed dangerous, may justify rolling-back the settings responsible for such degrading pattern to some original configuration. Alternatively, the manufacturer may set the relevant parametrization responsible for the degradation to some configuration that is known to be safe through a software update process. This way the autonomous vehicle evaluation system 102 may act not only as a powerful advisory mechanism, but also as a watch-dog of the autonomous driving control system 104. Accordingly, the autonomous vehicle evaluation system 102 may be used to initiate safety recalls, system-warnings, or the like.

In some examples, in addition to the pattern degradation output, the autonomous vehicle evaluation system 102 may generate additional outputs that provide other measures of efficiency such as gasoline consumption, time to complete a trip, and the like.

The evaluation system may be in a unique position to immediately assess the effectiveness and safety and thus keep the autonomous driving control system safe (by immediately reporting to the manufacturer computing platform 105 detected dangerous behavior and/or degrading behavior) particularly since the self-modification likely may happen at the same time the driving situations unfold. Thus, an evaluation of the self-modification may be available immediately. Additionally, even though an evaluation is possible off-line it may be better to have an autonomous driving control system 104 installed on the autonomous vehicle. In these situations, when a data connection might not be available, the recording and immediate assessment of risk based on all that has been learned by the autonomous vehicle evaluation system 102 about the specific autonomous driving system may be available for immediate reporting. Additionally, it may be impractical with today's telematics technology to transmit the large amounts of data associated with the autonomous vehicle sensor (e.g., Lidar, Radar and Visible Camera sensors, and the like) to the cloud. Thus, in some examples, the autonomous vehicle evaluation system 102 may be deployed in the same vehicle as the autonomous driving control system for real-time response. For off-line processing (under situations that may be beneficial such as post-diagnostics) it may be possible to deploy the autonomous vehicle evaluation system 102 in the cloud.

At step 219, the autonomous vehicle evaluation system 102 may establish a connection with the autonomous driving control system 104. For example, the autonomous vehicle evaluation system 102 may establish a fourth wireless data connection with the autonomous driving control system 104 to link the autonomous vehicle evaluation system 102 to the autonomous driving control system 104.

At step 220, the autonomous vehicle evaluation system 102 may send the pattern degradation output generated at step 218 to the autonomous driving control system 104. For example, the autonomous vehicle evaluation system 102 may send the pattern degradation output via the communication interface 113 and while the fourth wireless data connection is established. In some examples, in sending the pattern degradation output, the autonomous vehicle evaluation system 102 may send one or more safety and effectiveness assessments to the autonomous driving control system 104.

Figure 2F:
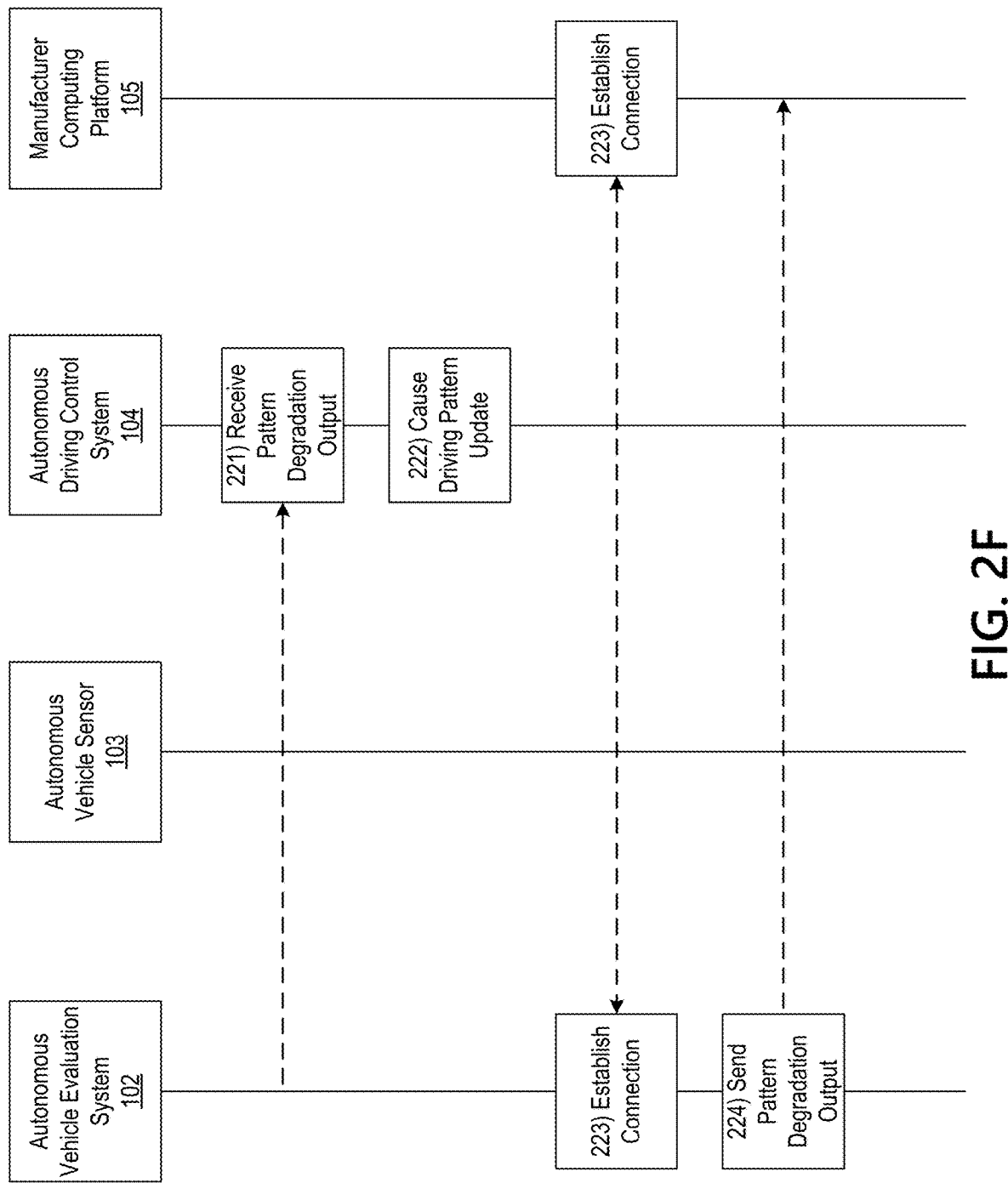

Referring to FIG. 2F, at step 221, the autonomous driving control system 104 may receive the pattern degradation output sent at step 220. For example, the autonomous driving control system 104 may receive the pattern degradation output while the fourth wireless data connection is established.

At step 222, the autonomous driving control system 104 may cause stored driving patterns to update based on the pattern degradation output received at step 221. For example, the autonomous driving control system 104 may use the information provided by the autonomous vehicle evaluation system 102 as input and as advisory that may inform future decisions. Ultimately, the autonomous driving control system 104 may use the pattern degradation output provided by the autonomous vehicle evaluation system 102 described here to improve its own learning.

At step 223, the autonomous vehicle evaluation system 102 may establish a connection with manufacturer computing platform 105. For example, the autonomous vehicle evaluation system 102 may establish a fifth wireless data connection with the manufacturer computing platform 105 to link the autonomous vehicle evaluation system 102 to the manufacturer computing platform 105.

At step 224, the autonomous vehicle evaluation system 102 may send the pattern degradation output to the manufacturer computing platform 105. For example, the autonomous vehicle evaluation system 102 may send the pattern degradation output while the fifth wireless data connection is established and via the communication interface 113. In some examples, the autonomous vehicle evaluation system 102 may send the pattern degradation output to the manufacturer computing platform 105 and the autonomous driving control system at the same time.

Figure 2G:
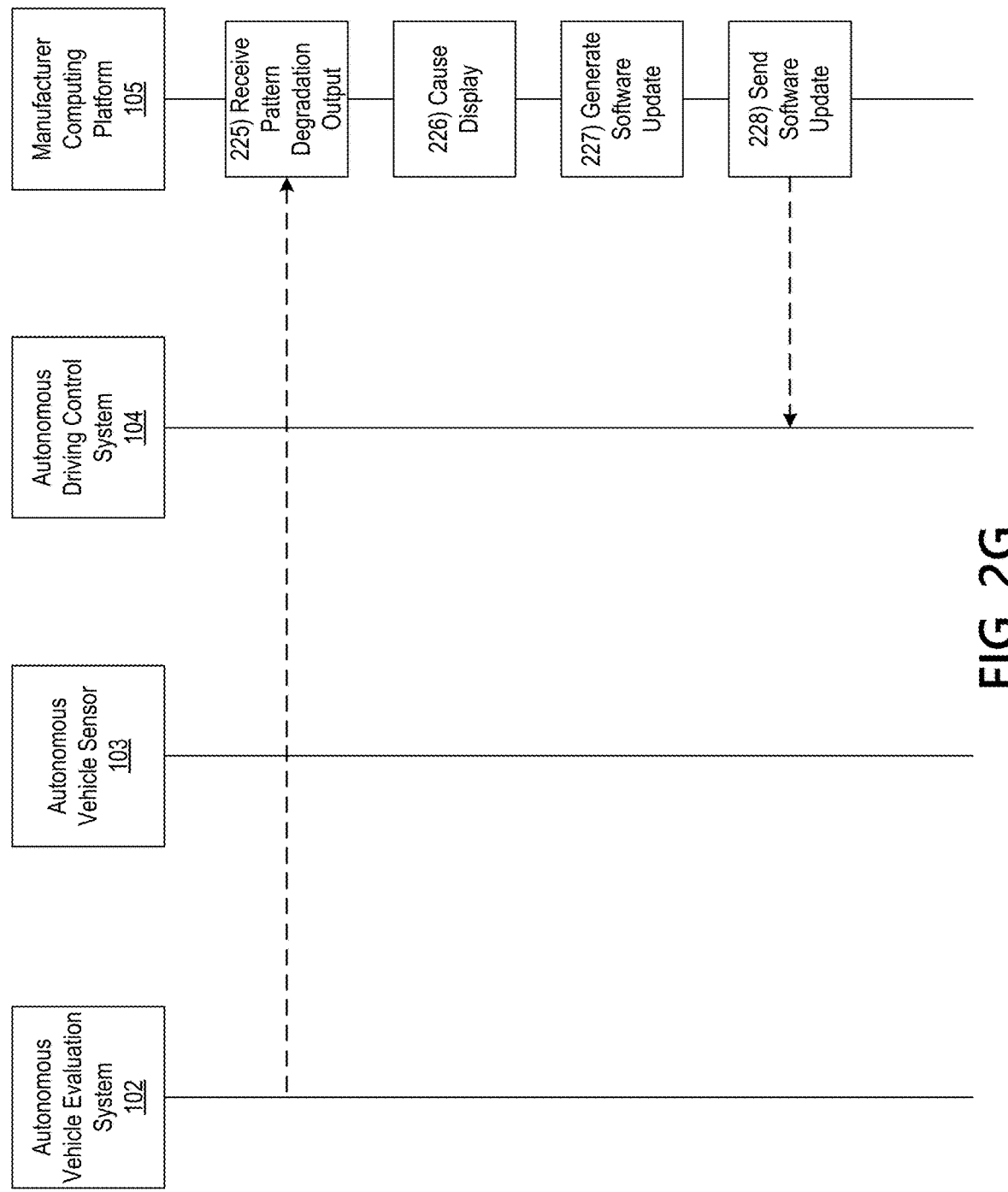

Referring to FIG. 2G, at step 225, the manufacturer computing platform 105 may receive the pattern degradation output from the autonomous vehicle evaluation system 102. For example, the manufacturer computing platform 105 may receive the pattern degradation output while the fifth wireless data connection is established.

At step 226, the manufacturer computing platform 105 may cause display of pattern degradation output. For example, the manufacturer computing platform 105 may generate one or more user interfaces to notify one or more employees, of the manufacturer, of the pattern degradation output.

At step 227, the manufacturer computing platform 105 may generate one or more autonomous driving software updates to be applied to the autonomous driving control system 104. In some examples, the manufacturer computing platform 105 may generate the one or more autonomous driving software updates based on the pattern degradation output. In some examples, in generating the autonomous driving software updates, the manufacturer computing platform 105 may generate one or more widespread updates to be applied to autonomous driving control systems corresponding to multiple vehicles manufactured by the manufacturer.

At step 228, the manufacturer computing platform 105 may send the autonomous driving software update to the autonomous driving control system 104. For example, the manufacturer computing platform 105 may send the autonomous driving software update while the second wireless data connection is established.

Figure 2H:
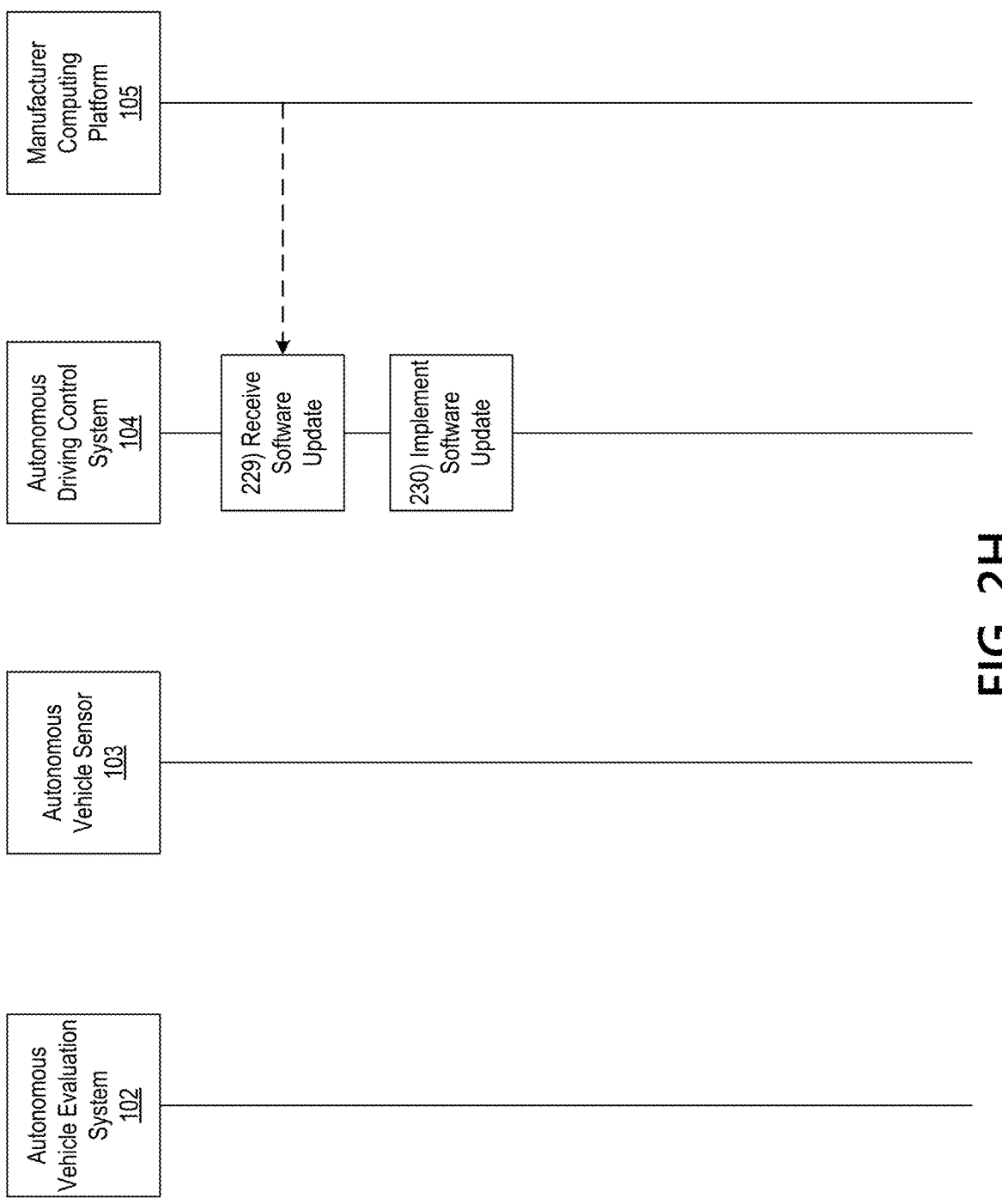

Referring to FIG. 2H, at step 229, the autonomous driving control system 104 may receive the autonomous driving software update from the manufacturer computing platform 105. For example, the autonomous driving control system 104 may receive the autonomous driving software update while the second wireless data connection is established.

At step 230, the autonomous driving control system 104 may implement the autonomous driving software update received at step 226. For example, the autonomous driving control system 104 may cause stored driving patterns to be updated based on the autonomous driving software update.

Figure 3:
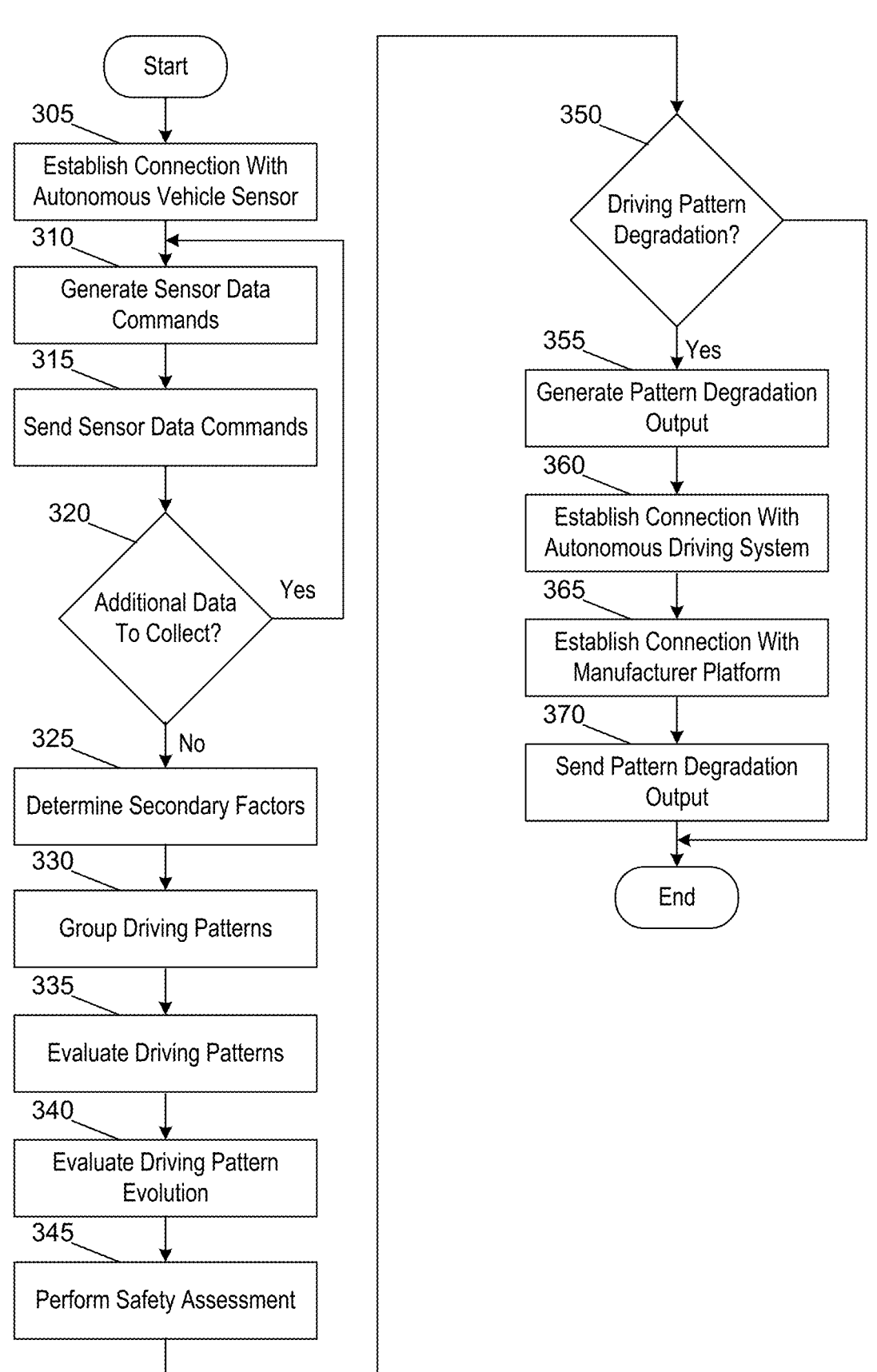
FIG. 3 depicts an illustrative method for deploying an autonomous vehicle evaluation system that performs evaluation of the actions, strategies, preferences, margins, and/or responses of an autonomous driving control system in accordance with one or more example embodiments.

FIG. 3 depicts an illustrative method for deploying an autonomous vehicle evaluation system that performs evaluation of the actions, strategies, preferences, margins, and/or responses of an autonomous driving control system in accordance with one or more example embodiments. Referring to FIG. 3, at step 305, an autonomous vehicle evaluation system may establish a connection with one or more autonomous vehicle sensors. At step 310, the autonomous vehicle evaluation system may generate one or more commands directing one or more autonomous vehicle sensors to provide sensor data. At step 315, the autonomous vehicle evaluation system may send the one or more commands directing one or more autonomous vehicle sensors to provide sensor data to the one or more autonomous vehicle sensors. At step 320, the autonomous vehicle evaluation system may determine whether additional sensor data should be collected. If the autonomous vehicle evaluation system determines that additional sensor data should be collected, the autonomous vehicle evaluation system may return to step 310. If the autonomous vehicle evaluation system determines that additional sensor data should not be collected, the autonomous vehicle evaluation system may proceed to step 325.

At step 325, the autonomous vehicle evaluation system may determine one or more secondary factors to consider in driving pattern evaluation. At step 330, the autonomous vehicle evaluation system may group driving patterns. At step 335, the autonomous vehicle evaluation system may evaluate the grouped driving patterns. At step 340, the autonomous vehicle evaluation system may evaluate an evolution of driving patterns at an autonomous driving control system. At step 345, the autonomous vehicle evaluation system may perform a safety assessment based on the driving patterns and their evolution. At step 350, the autonomous vehicle evaluation system may determine whether driving pattern degradation has occurred. If the autonomous vehicle evaluation system determines that driving pattern degradation has not occurred, the method may end. If the autonomous vehicle evaluation system determines that driving pattern degradation has occurred, the autonomous vehicle evaluation system may proceed to step 355.

At step 355, the autonomous vehicle evaluation system may generate a pattern degradation output. At step 360, the autonomous vehicle evaluation system may establish a connection with the autonomous driving control system. At step 365, the autonomous vehicle evaluation system may establish a connection with a manufacturer computing platform. At step 370, the autonomous vehicle evaluation system may send the pattern degradation output to the autonomous driving control system and the manufacturer computing platform. In one or more instances, the autonomous vehicle evaluation system may send, along with the pattern degradation output, an indication of corrective actions to be taken to correct the degradation pattern (e.g., retrain stored models, update software, send alerts/warnings, or the like).

This disclosure is applicable to any system that uses or applies artificial intelligence. Therefore, the scope of this disclosure is not limited to autonomous driving vehicles only but to any system that is developed based on artificial intelligence and thus requires evaluation. Examples of the type of systems for which this invention applies are: Personal Voice Assistants, Autonomous Robotic Systems, and others. The ideas, principles and methods can be extended to perform an evaluation that is equivalent to the type of evaluation that has been described in the present disclosure.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Learning of the driving action patterns may allow recognition of the different specific skills that the autonomous driving control system 104 may have. Given the fact that the autonomous vehicle evaluation system 102 may recognize these skills, it may be in the position to evaluate the evolution of such skills over time. The autonomous driving control system 104 may perform better or worse over time according to the ability of the autonomous technology to improve the outcomes of the driving actions patterns. It is possible that there may be a ceiling on the learning curve of the autonomous driving control system 104 and this situation may also be assessed by the autonomous vehicle evaluation system 102. An independent assessment of autonomous driving skills developed by the autonomous vehicle evaluation system 102 described herein may be provided to the manufacturer of the autonomous driving control system 104. Additionally, having multiple realizations of the autonomous vehicle evaluation system 102 described herein being deployed with autonomous systems developed by different manufacturers may allow for comparison of the technologies and more specifically a comparison of the artificial intelligence components associated with them. If the manufacturers at some point would like to join forces to jointly improve the technology on a consortium or forum then the information generated by the autonomous vehicle evaluation system 102 described here may be invaluable for such purpose. In this sense, the information developed and learned by the autonomous vehicle evaluation system 102 about the artificial intelligence aspects may allow the manufacturers to learn from each other about the possibilities for autonomous control, and autonomous response and reactions (all this without revealing code, in some instances). Similarly, through sharing of this information, standards for autonomous driving performance evaluation may be developed around the information explored and developed by the autonomous vehicle evaluation system described herein.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface communicatively coupled to the at least one processor; and memory storing computer-readable instructions that, when executed by the at least one processor, cause the computing platform to:

determine that an autonomous driving system of an autonomous vehicle has caused evolution of one or more driving patterns;

generate, based on the evolution, one or more learning curves for the autonomous driving system;

determine that the evolution caused the autonomous driving system to fall below a predetermined safety threshold based on the learning curves;

determine, in response to determining that the evolution caused the autonomous driving system to fall below the predetermined safety threshold, a driving pattern degradation output for the autonomous vehicle based on sensor data, the sensor data indicating at least one of:

an attentiveness distribution associated with one or more neighboring vehicles; or an aggressiveness distribution associated with the one or more neighboring vehicles; and send the driving pattern degradation output to cause the autonomous driving system of the autonomous vehicle to perform an autonomous action by reducing speed instead of changing lanes in response to the attentiveness distribution or the aggressiveness distribution.

2. The computing platform of claim 1, wherein performing the autonomous vehicle action includes reducing speed instead of changing lanes in response to the attentiveness distribution or the aggressiveness distribution.

3. The computing platform of claim 1, wherein the computer-readable instructions, when executed by the at least one processor, further cause the computing platform to receive, while the vehicle is operating in an autonomous mode, the sensor data from one or more autonomous vehicle sensors, and the computing platform is an autonomous vehicle evaluation system configured to evaluate the autonomous driving system autonomously operating the vehicle.

4. The computing platform of claim 1, wherein the computer-readable instructions, when executed by the at least one processor, further cause the computing platform to:

determine, based on the sensor data, one or more driving patterns; and group the one or more driving patterns based on a primary context corresponding to the one or more driving patterns, wherein the driving pattern degradation output indicates degradation corresponding to the one or more driving patterns.

5. The computing platform of claim 1, wherein the sensor data used for determining the driving pattern degradation output further indicates an identification of the one or more neighboring vehicles as human or as another autonomous driving system.

6. The computing platform of claim 1, wherein the sensor data used for determining the driving pattern degradation output further indicates a lane changing pattern of the one or more neighboring vehicles.

7. The computing platform of claim 1, wherein the sensor data used for determining the driving pattern degradation output further indicates a front vehicle performing hard braking.

8. The computing platform of claim 1, wherein the autonomous vehicle action includes changing an acceleration parameter for a lane change.

9. The computing platform of claim 1, wherein the autonomous vehicle action includes changing a lane change acceleration value.

10. The computing platform of claim 1, wherein the autonomous vehicle action includes reducing a speed based on the sensor data indicating a presence of one or more aggressive drivers.

11. A method comprising:

receiving, by a computing device having at least one processor and while an autonomous vehicle is operating in an autonomous mode, sensor data from one or more vehicle sensors;

determining that an autonomous driving system of the autonomous vehicle has caused evolution of one or more driving patterns;

generating, based on the evolution, one or more learning curves for the autonomous driving system;

determining that the evolution caused the autonomous driving system to fall below a predetermined safety threshold based on the learning curves;

determining in response to determining that the evolution caused the autonomous driving system to fall below the predetermined safety threshold, by the at least one processor, a driving pattern degradation output based on the sensor data, the sensor data indicating at least one of:

an attentiveness distribution associated with a plurality of neighboring vehicles; or an aggressiveness distribution associated with the plurality of neighboring vehicles; and sending, by the at least one processor, the driving pattern degradation output to cause the autonomous driving system of the vehicle to perform an autonomous action by reducing speed instead of changing lanes in response to the attentiveness distribution or the aggressiveness distribution.

12. The method of claim 11, wherein performing the autonomous vehicle action includes reducing speed instead of changing lanes in response to the attentiveness distribution or the aggressiveness distribution.

13. The method of claim 11, wherein the autonomous vehicle action includes increasing a lane change acceleration based on the sensor data indicating a presence of a neighboring vehicle behind the vehicle in a target lane.

14. The method of claim 13, wherein the sensor data indicates the neighboring vehicle is within six meters of the vehicle.

15. The method of claim 11, wherein the autonomous vehicle action includes decreasing a lane change acceleration based on an absence of a neighboring vehicle within a predetermined distance behind the vehicle in a target lane.

16. The method of claim 11, wherein the sensor data used for determining the driving pattern degradation output further indicates an identification of a neighboring vehicle as human or as another autonomous driving system.

17. The method of claim 11, wherein the sensor data used for determining the driving pattern degradation output further indicates a lane changing pattern of a neighboring vehicle.

18. The method of claim 11, wherein the sensor data used for determining the driving pattern degradation output further indicates a front vehicle performing hard braking.

19. A non-transitory computer readable medium storing computer executable instructions which, when executed by a processor, cause a computing device to perform steps comprising:

determining that an autonomous driving system of an autonomous vehicle has caused evolution of one or more driving patterns;

generating, based on the evolution, one or more learning curves for the autonomous driving system;

determining that the evolution caused the autonomous driving system to fall below a predetermined safety threshold based on the learning curves;

determining, in response to determining that the evolution caused the autonomous driving system to fall below the predetermined safety threshold, a driving pattern degradation output for a vehicle based on sensor data, the sensor data indicating at least one of:

an attentiveness distribution associated with one or more neighboring vehicles; or an aggressiveness distribution associated with the one or more neighboring vehicles; and sending the driving pattern degradation output causing the autonomous driving system of the autonomous vehicle to perform an autonomous action by reducing speed instead of changing lanes in response to the attentiveness distribution or the aggressiveness distribution.

20. The non-transitory computer readable medium of claim 19, wherein the computer executable instructions, when executed by the processor, further cause the computing device to receive, while the vehicle is operating in an autonomous mode, the sensor data from one or more autonomous vehicle sensors including at least one of a camera, a lidar sensor, or a radar sensor, and the computing device is an autonomous vehicle evaluation system configured to evaluate the autonomous driving system autonomously operating the vehicle.

\* \* \* \* \*